(12) United States Patent
Gupta

(10) Patent No.: US 10,114,726 B2
(45) Date of Patent: Oct. 30, 2018

(54) AUTOMATED ROOT CAUSE ANALYSIS OF SINGLE OR N-TIERED APPLICATION

(71) Applicant: Virsec Systems, Inc., Santa Clara, CA (US)

(72) Inventor: Satya Vrat Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 196 days.

(21) Appl. No.: 15/318,419

(22) PCT Filed: Jun. 24, 2015

(86) PCT No.: PCT/US2015/037468
§ 371 (c)(1),
(2) Date: Dec. 13, 2016

(87) PCT Pub. No.: WO2015/200508
PCT Pub. Date: Dec. 30, 2015

(65) Prior Publication Data
US 2017/0123957 A1 May 4, 2017

Related U.S. Application Data

(60) Provisional application No. 61/998,321, filed on Jun. 24, 2014.

(51) Int. Cl.
*G06F 11/36* (2006.01)
*G06F 11/07* (2006.01)
*G06F 11/34* (2006.01)

(52) U.S. Cl.
CPC ...... *G06F 11/3612* (2013.01); *G06F 11/0709* (2013.01); *G06F 11/079* (2013.01);
(Continued)

(58) Field of Classification Search
CPC .................. G06F 11/3612; G06F 11/3632
(Continued)

(56) References Cited

U.S. PATENT DOCUMENTS 4,215,406 A 7/1980 Gomola et al.
4,466,077 A 8/1984 Iannucci et al.
(Continued)

FOREIGN PATENT DOCUMENTS

EP 1 085 418 3/2001
JP 2003330736 A 11/2003
(Continued)

OTHER PUBLICATIONS

Aarniala, J., "Instrumenting Java bytecode," Seminar work for the Compilers-course, Department of Computer Science University of Helsinki, Finland (Spring 2005).
(Continued)

*Primary Examiner* — Chae M Ko
(74) *Attorney, Agent, or Firm* — Hamilton, Brook, Smith & Reynolds, P.C.

(57) ABSTRACT

In an example embodiment, a system may facilitate a root cause analysis associated with one or more computer applications. The system may receive a global time reference at the one or more computer applications. Each computer application may have a corresponding local time reference. Each computer application may synchronize its local time reference with the global time reference. The system may monitor at least one computer instructions of the computer applications with respect to the corresponding local time reference. The system may retrieve information associated with the at least one computer instruction. The system may forward at least a portion of the retrieved computer instruction information to a validation engine. The system may
(Continued)

facilitate the root cause analysis using the at least a portion of the retrieved computer instruction information.

22 Claims, 10 Drawing Sheets

(52) U.S. Cl.
CPC ...... *G06F 11/0715* (2013.01); *G06F 11/0748* (2013.01); *G06F 11/3466* (2013.01); *G06F 11/366* (2013.01); *G06F 11/3664* (2013.01)

(58) Field of Classification Search
USPC ........................................................ 714/38.1
See application file for complete search history.

(56) References Cited

U.S. PATENT DOCUMENTS

| | | |
|---|---|---|
| 4,672,534 A | 6/1987 | Kamiya |
| 4,751,667 A | 6/1988 | Ross |
| 5,222,220 A | 6/1993 | Mehta |
| 5,235,551 A | 8/1993 | Sinofsky et al. |
| 5,359,659 A | 10/1994 | Rosenthal |
| 5,390,309 A | 2/1995 | Onodera |
| 5,440,723 A | 8/1995 | Arnold et al. |
| 5,684,948 A | 11/1997 | Johnson et al. |
| 5,826,012 A | 10/1998 | Lettvin |
| 5,829,039 A | 10/1998 | Sugino et al. |
| 5,850,559 A | 12/1998 | Angelo et al. |
| 5,873,124 A | 2/1999 | Draves |
| 5,890,005 A | 3/1999 | Lindholm |
| 5,909,580 A | 6/1999 | Crelier et al. |
| 5,933,594 A | 8/1999 | La Joie et al. |
| 5,983,348 A | 11/1999 | Ji |
| 6,151,618 A | 11/2000 | Wahbe et al. |
| 6,178,522 B1 * | 1/2001 | Zhou ................. G06F 11/181 714/11 |
| 6,240,501 B1 | 5/2001 | Hagersten |
| 6,553,429 B1 | 4/2003 | Wentz et al. |
| 6,665,316 B1 | 12/2003 | Eidson |
| 6,775,780 B1 | 8/2004 | Muttik |
| 6,782,478 B1 | 8/2004 | Probert |
| 6,832,302 B1 | 12/2004 | Fetzer et al. |
| 6,948,091 B2 | 9/2005 | Bartels et al. |
| 6,973,577 B1 | 12/2005 | Kouznetsov |
| 6,981,176 B2 | 12/2005 | Fruehling et al. |
| 7,257,763 B1 | 8/2007 | Srinivasan et al. |
| 7,260,845 B2 | 8/2007 | Kedma et al. |
| 7,272,748 B1 | 9/2007 | Conover et al. |
| 7,281,225 B2 | 10/2007 | Jain et al. |
| 7,284,276 B2 | 10/2007 | Conover et al. |
| 7,328,323 B1 | 2/2008 | Conover |
| 7,383,166 B2 | 6/2008 | Ashar et al. |
| 7,386,839 B1 | 6/2008 | Golender et al. |
| 7,453,910 B1 * | 11/2008 | Biberstein ................ G06F 1/12 370/503 |
| 7,484,239 B1 | 1/2009 | Tester et al. |
| 7,490,268 B2 | 2/2009 | Keromytis et al. |
| 7,526,654 B2 | 4/2009 | Charbonneau |
| 7,526,755 B2 | 4/2009 | DeLine et al. |
| 7,539,875 B1 | 5/2009 | Manferdelli et al. |
| 7,555,747 B1 | 6/2009 | Agesen |
| 7,603,704 B2 | 10/2009 | Bruening et al. |
| 7,603,715 B2 | 10/2009 | Costa et al. |
| 7,613,954 B2 | 11/2009 | Grey et al. |
| 7,634,812 B2 | 12/2009 | Costa et al. |
| 7,644,440 B2 | 1/2010 | Sinha et al. |
| 7,730,305 B2 | 6/2010 | Eun et al. |
| 7,747,725 B2 | 6/2010 | Williams et al. |
| 7,895,651 B2 | 2/2011 | Brennan et al. |
| 7,971,044 B2 | 6/2011 | Dieffenderfer et al. |
| 7,971,255 B1 | 6/2011 | Kc et al. |
| 8,042,180 B2 | 10/2011 | Gassoway |
| 8,151,117 B2 | 4/2012 | Hicks |
| 8,261,326 B2 | 9/2012 | Ben-Natan |
| 8,307,191 B1 | 11/2012 | Jain |
| 8,336,102 B2 | 12/2012 | Neystadt et al. |
| 8,353,040 B2 | 1/2013 | Tahan et al. |
| 8,510,596 B1 | 8/2013 | Gupta et al. |
| 8,954,738 B2 | 2/2015 | Asokan et al. |
| 8,958,546 B2 | 2/2015 | Probert |
| 8,966,312 B1 | 2/2015 | Gupta et al. |
| 9,230,455 B2 | 1/2016 | Probert |
| 9,418,227 B2 | 8/2016 | Franklin |
| 2001/0013094 A1 | 8/2001 | Etoh et al. |
| 2001/0033657 A1 | 10/2001 | Lipton et al. |
| 2001/0047510 A1 | 11/2001 | Angel et al. |
| 2002/0129226 A1 | 9/2002 | Eisen et al. |
| 2002/0138554 A1 | 9/2002 | Feigen et al. |
| 2003/0023865 A1 | 1/2003 | Cowie et al. |
| 2003/0028755 A1 | 2/2003 | Ohsawa et al. |
| 2003/0033498 A1 | 2/2003 | Borman et al. |
| 2003/0041290 A1 | 2/2003 | Peleska |
| 2003/0079158 A1 | 4/2003 | Tower et al. |
| 2003/0120884 A1 | 6/2003 | Koob et al. |
| 2003/0120885 A1 | 6/2003 | Bonola |
| 2003/0145253 A1 | 7/2003 | de Bonet |
| 2003/0188160 A1 | 10/2003 | Sunder et al. |
| 2003/0188174 A1 | 10/2003 | Zisowski |
| 2003/0191940 A1 | 10/2003 | Sinha et al. |
| 2003/0212913 A1 | 11/2003 | Vella |
| 2004/0049660 A1 | 3/2004 | Jeppesen et al. |
| 2004/0103252 A1 | 5/2004 | Lee et al. |
| 2004/0117682 A1 | 6/2004 | Xu |
| 2004/0120173 A1 | 6/2004 | Regev et al. |
| 2004/0133777 A1 | 7/2004 | Kiriansky et al. |
| 2004/0157639 A1 | 8/2004 | Morris et al. |
| 2004/0162861 A1 | 8/2004 | Detlefs |
| 2004/0215755 A1 | 10/2004 | O'Neill |
| 2004/0221120 A1 | 11/2004 | Abrashkevich et al. |
| 2004/0268095 A1 | 12/2004 | Shpeisman et al. |
| 2004/0268319 A1 | 12/2004 | Tousignant |
| 2005/0010804 A1 | 1/2005 | Bruening et al. |
| 2005/0022153 A1 * | 1/2005 | Hwang ................. G06Q 10/10 717/100 |
| 2005/0028048 A1 | 2/2005 | New et al. |
| 2005/0033980 A1 | 2/2005 | Willman et al. |
| 2005/0039178 A1 | 2/2005 | Marolia et al. |
| 2005/0055399 A1 | 3/2005 | Savchuk |
| 2005/0071633 A1 | 3/2005 | Rothstein |
| 2005/0086502 A1 | 4/2005 | Rayes et al. |
| 2005/0108562 A1 | 5/2005 | Khazan et al. |
| 2005/0138409 A1 | 6/2005 | Sheriff et al. |
| 2005/0144471 A1 | 6/2005 | Shupak et al. |
| 2005/0144532 A1 | 6/2005 | Dombrowa et al. |
| 2005/0172115 A1 | 8/2005 | Bodorin et al. |
| 2005/0195748 A1 | 9/2005 | Sanchez |
| 2005/0223238 A1 | 10/2005 | Schmid et al. |
| 2005/0273854 A1 | 12/2005 | Chess et al. |
| 2005/0283835 A1 | 12/2005 | Lalonde et al. |
| 2005/0289527 A1 | 12/2005 | Illowsky et al. |
| 2006/0002385 A1 | 1/2006 | Johnsen et al. |
| 2006/0020936 A1 | 1/2006 | Wyatt |
| 2006/0021035 A1 | 1/2006 | Conti et al. |
| 2006/0026311 A1 | 2/2006 | Nicolai et al. |
| 2006/0075274 A1 | 4/2006 | Zimmer et al. |
| 2006/0126799 A1 | 6/2006 | Burk |
| 2006/0143707 A1 | 6/2006 | Song et al. |
| 2006/0155905 A1 | 7/2006 | Leino et al. |
| 2006/0161583 A1 | 7/2006 | Burka et al. |
| 2006/0195745 A1 | 8/2006 | Keromytis et al. |
| 2006/0212837 A1 | 9/2006 | Prasad |
| 2006/0242703 A1 | 10/2006 | Abeni |
| 2006/0248519 A1 | 11/2006 | Jaeger et al. |
| 2006/0265438 A1 | 11/2006 | Shankar et al. |
| 2006/0271725 A1 | 11/2006 | Wong |
| 2006/0282891 A1 | 12/2006 | Pasko |
| 2007/0016953 A1 | 1/2007 | Morris et al. |
| 2007/0027815 A1 | 2/2007 | Sobel et al. |
| 2007/0050848 A1 | 3/2007 | Khalid |
| 2007/0067359 A1 | 3/2007 | Barrs et al. |
| 2007/0118646 A1 | 5/2007 | Gassoway |
| 2007/0136455 A1 | 6/2007 | Lee et al. |

(56) References Cited

U.S. PATENT DOCUMENTS

| | | |
|---|---|---|
| 2007/0157003 A1 | 7/2007 | Durham et al. |
| 2007/0169075 A1 | 7/2007 | Lill et al. |
| 2007/0174549 A1 | 7/2007 | Gyl et al. |
| 2007/0174703 A1 | 7/2007 | Gritter et al. |
| 2007/0192854 A1 | 8/2007 | Kelley et al. |
| 2007/0274311 A1 | 11/2007 | Yang |
| 2008/0215925 A1 | 9/2008 | Degenaro et al. |
| 2008/0250496 A1 | 10/2008 | Namihira |
| 2008/0301647 A1 | 12/2008 | Neystadt et al. |
| 2009/0144698 A1 | 6/2009 | Fanning et al. |
| 2009/0158075 A1* | 6/2009 | Biberstein ............... G06F 1/12 713/375 |
| 2009/0217377 A1 | 8/2009 | Arbaugh et al. |
| 2010/0005531 A1 | 1/2010 | Largman et al. |
| 2010/0064111 A1 | 3/2010 | Kunimatsu et al. |
| 2010/0287535 A1 | 11/2010 | Kim et al. |
| 2012/0166878 A1 | 6/2012 | Sinha et al. |
| 2012/0284697 A1 | 11/2012 | Choppakatla et al. |
| 2013/0086020 A1 | 4/2013 | Addala |
| 2013/0239215 A1 | 9/2013 | Kaufman |
| 2014/0047282 A1* | 2/2014 | Deb ................... G06F 11/0751 714/48 |
| 2014/0108803 A1 | 4/2014 | Probert |
| 2014/0337639 A1 | 11/2014 | Probert |
| 2016/0094349 A1 | 3/2016 | Probert |
| 2016/0212159 A1 | 7/2016 | Gupta et al. |
| 2017/0132419 A1 | 5/2017 | Gupta |

FOREIGN PATENT DOCUMENTS

| | | |
|---|---|---|
| JP | 2004287810 A | 10/2004 |
| JP | 2005276185 A | 10/2005 |
| JP | 2009031859 A | 2/2009 |
| JP | 2011059930 A | 3/2011 |
| JP | 2014531647 A | 11/2014 |
| WO | 2010067703 A1 | 6/2010 |
| WO | WO 2015/038944 | 3/2015 |
| WO | WO 2015/200508 | 12/2015 |
| WO | WO 2015/200511 | 12/2015 |

OTHER PUBLICATIONS

Bernat, A.R. et al., "Anywhere, Any-Time Binary Instrumentation," Proceedings of the 10th ACM SIGPLAN-SIGSOFT workshop on Program analysis for software tools (PASTE). ACM, Szeged, Hungary (Sep. 2011).

Buck, B., et al., "An API for Runtime Code Patching," Jan. 1, 2000, vol. 14, No. 4, pp. 317-329, XP008079534, Jan. 1, 2000.

"Software Instrumentation," edited by Wah, B., Wiley Encyclopedia of Computer Science and Engineer, Wiley, pp. 1-11, XP007912827, Jan. 1, 2008.

Ashcraft, K. and Engler, D., "Using Programmer-Written Compiler Extensions to Catch Security Holes," Slides presented at the Proceedings of the IEEE Symposium on Security and Privacy, Berkeley, CA, pp. 1-14, (May 2000).

Austin, T., et al., "Efficient Detection of All Pointer and Array Access Errors," Proceedings of the ACM SIGPLAN 94 Conference on Programming Language Design and Implementation, Orlando, FL, 12 pages (Jun. 1994).

Baratloo, A., et al., "Transparent Run-Time Defense Against Stack Smashing Attacks," Proceedings of the USENIX 2000 Annual Technical Conference, San Diego, CA, 12 pages (Jun. 2000).

Barrantes, E., et al., "Randomized Instruction Set Emulation to Distrupt Binary Code Injection Attacks," Proceedings of the $10^{th}$ Annual ACM Conference on Computer and Communications Security, Washington, DC, 10 pages (Oct. 2003).

Berger, E. and Zorn, B., "Diehard: Probabilistic Memory Safety for Unsafe Languages," Proceedings of the Programming Language Design and Implementation (PLDI), 11 pages (Jun. 2006).

Bhatkar, S., et al., Address Obfuscation: An Efficient Approach to Combat a Broad Range of Memory Error Exploits, Proceedings of the $12^{th}$ USENIX Security Symposium, Washington, DC, 16 pages (Aug. 2003).

http://bochs.sourceforge.net, The Open Source IA-32, 59 pages, retrieved from Internet Nov. 15, 2007.

Bush, W., et al., "A Static Analyzer for Finding Dynamic Programming Errors," Software: Practice and Experience, 30(7): 775-802 (Jun. 2000).

www.cert.org, Computer Emergency Response Team (CERT), 2 pages, retrieved from Internet Feb. 3, 2009.

Pyo, Changwoo and Lee, Gyungho, "Encoding Function Pointers and Memory Arrangement Checking Against Buffer Overflow Attack," $4^{th}$ International Conference Information and Communications Security (ICICS), pp. 25-36 (Dec. 2002).

Chew, M. and Song, D., "Mitigating Buffer Overflows by Operating System Randomization," (Report No. CMU-CS-02-197), Carnegie Mellon University, 11 pages (Dec. 2002).

Chiueh, T. and Hsu, F., "RAD: A Compile-Time Solution to Buffer Overflow Attacks," Proceedings of the $21^{st}$ International Conference on Distributed Computing Systems, Pheonix, AZ, 20 pages (Apr. 2001).

Cowan, C., et al., "Stackguard: Automatic Adaptive Detection and Prevention of Buffer-Overflow Attacks," Proceedings of the $7^{th}$ USENIX Security Conference, San Antonio, TX, 16 pages (Jan. 1998).

Cowan, C., et al., "FormatGuard: Automatic Protection from Printf Format String Vulnerabilities," Proceedings of the $10^{th}$ USENIX Security Symposium, Washington, DC, 9 pages (Aug. 2001 ).

Cowan, C., et al., "Protecting Systems from Stack Smashing Attacks with StackGuard," Linux Expo, Raleigh, NC, 11 pages (May 1999).

Cowan, C., et al., "PointGuard™: Protecting Pointers From Buffer Overflow Vulnerabilities," Proceedings of the $12^{th}$ USENIX Security Symposium, Washington, DC, 15 pages (Aug. 2003).

Dhurjati, D., et al., "Memory Safety Without Runtime Checks or Garbage Collection," Proceedings of the 2003 ACM SIGPLAN Conference on Language, Compiler, and Tool Support for Embedded Systems, San Diego, CA, 12 pages (Jun. 2003).

Dor, S., et al., "Cleanness Checking of String Manipulation in C Programs via Integer Analysis," Proceedings of the $8^{th}$ International Static Analysis Symposium, Paris, France, Springer LNCS 2126:194-212 (Jul. 2001).

Erlingsson, U. and Schneider, F., "SASI Enforcement of Security Policies: A Retrospective," Proceedings of the New Security Paradigm Workshop, Caledon Hills, Ontario, Canada, 17 pages (Sep. 1999).

Etoh, H. and Yoda, K., "Protecting from Stack-Smashing Attacks," IBM Research Division, Tokyo Research Laboratory, Jun. 2000, www.trl.ibm.com, 23 pages, retrieved from Internet Nov. 6, 2007.

Evans, D. and Larachelle D., "Improving Security Using Extensible Lightweight Static Analysis," IEEE Software, 19(1):42-51 (Jan.-Feb. 2002).

Evans, D., "Policy-Directed Code Safety," Department of Electrical Engineering and Computer Science, Massachusetts Institute of Technology, 135 pages, Oct. 1999.

Feng, H., et al., "Anomaly Detection using Call Stack Information," IEEE Security and Privacy, Oakland, CA, 14 pages (May 2003).

Fink, G. and Bishop, M., "Property-Based Testing: A New Approach to Testing for Assurance," ACM SIGSOFT Software Engineering Notes, 22(4): 74-80 (Jul. 1997).

Forrest, S., et al., "A Sense of Self for Unix Processes," Proceedings of the IEEE Symposium on Security and Privacy, Oakland, CA, 9 pages (May 1996).

Foster, J., et al., "A Theory of Type Qualifiers," Proceedings of the 1999 ACM SIGPLAN Conference on Programming Language Design and Implementation (PLDI), Atlanta, GA, 12 pages (May 1999).

Frantzen, M. and Shuey, M., "StackGhost: Hardware Facilitated Stack Protection," Proceedings of the 10th USENIX Security Symposium, Washington, DC, 11 pages (Aug. 2001).

Ganapathy, V., et al., "Buffer Overrun Detection using Linear Programming and Static Analysis," Proceedings of the 10th ACM Conference on Computer and Communication Security, Washington D.C, 10 pages (Oct. 2003).

(56) References Cited

OTHER PUBLICATIONS

Gaurav, S., et al., "Countering Code-Injection Attacks With Instruction-Set Randomization," Proceedings of the 10th ACM Conference on Computer and Communications Security (CCS2003), Washington, DC, 9 pages (Oct. 2003).
Ghosh, A.K. and O'Connor, T., "Analyzing Programs for Vulnerability to Buffer Overrun Attacks," Proceedings of the 21st NIST-NCSC National Information Systems Security Conference, 9 pages (Oct. 1998).
Goldberg, I., et al.., "A Secure Environment for Untrusted Helper Applications," Proceedings of the 6th USENIX Security Symposium, San Jose, CA, 13 pages (Jul. 1996).
Grimes, R., "Preventing Buffer Overruns in C++," Dr Dobb's Journal: Software Tools for the Professional Programmer, 29(1): 49-52 (Jan. 2004).
Hastings, R. and Joyce, B., "Purify: Fast Detection of Memory Leaks and Access Errors," Proceedings of the Winter 92 USENIX Conference, San Francisco, CA, 10 pages (Jan. 1992).
Haugh, E. and Bishop, M., "Testing C Programs for Buffer Overflow Vulnerabilities," Proceedings of the 10th Network and Distributed System Security Symposium (NDSS03), San Diego, CA, 8 pages (Feb. 2003).
Jim, T., et al., "Cyclone: A safe dialect of C," Proceedings of the USENIX Annual Technical Conference, Monterey, CA, 14 pages (Jun. 2002).
Jones, Richard W. M. and Kelly, Paul H. J., "Backwards-Compatible Bounds Checking for Arrays and Pointers in C Programs," Proceedings of the 3rd International Workshop on Automatic Debugging, Linkoping, Sweden, 29 pages (May 1997).
Kendall, Samuel C., "Bcc: Runtime Checking for C Programs," Proceedings of the USENIX Summer 1983 Conference, Toronto, Ontario, Canada, 14 pages, (Jul. 1983).
Kiriansky, V. , et al., "Secure Execution via Program Shepherding," Proceedings of the 11th USENIX Security Symposium, San Francisco, CA, 16 pages (Aug. 2002).
Phrack Magazine, "The Frame Pointer Overwriting," 55(9): 1-9 (Sep. 1999).
Krennmair, A., "ContraPolice: a libc Extension for Protecting Applications from Heap-Smashing Attacks," www.synflood.at/contrapolice, 5 pages, retrieved from Internet, Nov. 28, 2003.
Larochelle, D. and Evans, D., "Statically Detecting Likely Buffer Overflow Vulnerabilities," 2001 USENIX Security Symposium, Washington, D. C., 13 pages (Aug. 2001).
Larson, E. and Austin, T., "High Coverage Detection of Input-Related Security Faults," Proceedings of the 12th USENIX Security Symposium, Washington, District of Columbia, U.S.A, 16 pages (Aug. 2003).
Larus, J. R., et al., "Righting Software," IEEE Software, 21(3): 92-100 (May 2004).
Lee, R. B., et al., "Enlisting Hardware Architecture to Thwart Malicious Code Injection," First International Conference on Security in Pervasive Computing, LNCS vol. 2802, pp. 237-252, (Mar. 2003).
Lhee, K. and Chapin, S., "Buffer Overflow and Format String Overflow Vulnerabilities," Software-Practice and Experience, 33(5): 423-460 (Apr. 2003).
Lhee, K. and Chapin, S., "Type-Assisted Dynamic Buffer Overflow Detection," Proceedings of the 11th USENIX Security Symposium, San Francisco, CA, 9 pages (Aug. 2002).
Messier, M. and Viega, J., "Safe C String Library V1.0.3.," www.zork.org/safestr, 34 pages, retrieved from Internet, Nov. 2003.
www.metasploit.org, "Metasploit Projects," 3 pages, retrieved from Internet Feb. 3, 2009.
Necula, G., et al., "CCured: Type-Safe Retrofitting of Legacy Code," 29th SIGPLAN-SIGACT Symposium on Principles of Programming Languages (POPL), Portland, OR, pp. 128-139 (Jan. 2002).
Nergal, "The advanced return-into-libc exploits, PaX Case Study," Phrack Magazine, 58(4), 30 pages (Dec. 2001).

The NX Bit. Wikipedia article, www.wikipedia.org/wiki/NXbit, 9 pages, retrieved from Internet—Feb. 3, 2009.
Oiwa, Y, et al., "Fail-Safe ANSI-C Compiler: An Approach to Making C Programs Secure," Proceedings of the International Symposium on Software Security, Tokyo, Japan, 21 pages (Nov. 2002).
Ozdoganoglu, H., et al., "SmashGuard: A Hardware Solution to Prevent Security Attacks on the Function Return Address," (Report No. TR-ECE 03-13), Purdue University, 37 pages (Nov. 2003).
The PaX project. Powepoint presentation, Nov. 9, 2000, 13 pages, Retrieved from internet: http://pageexec.virtualave.net.
Bruce Perens, Electric Fence Malloc Debugger, www.perens.com/FreeSoftware, 10 pages, (Mar. 20, 2006).
Prasad, M. and Chiueh., T., "A Binary Rewriting Defense against Stack-Based Buffer Overflow Attacks," USENIX Technical Conference, 14 pages (Jun. 2003).
Prevelakis, V. and Spinellis, D., "Sandboxing Applications" Proceedings of the 2001 USENIX Annual Technical Conference (FREENIX Track), Boston, MA, 8 pages (Jun. 2001).
Provos, N., "Improving Host Security with System Call Policies," Proceedings of the $12^{th}$ USENIX Security Symposium, Washington, DC, 15 pages (Aug. 2003).
RATS website. Secure Software Inc., 4 pages, http://www.securesw.com/downloadrats.htm, retrieved from Internet 2009.
Engler, D., et al., "Checking System Rules Using System-Specific, Programmer-Written Compiler Extensions," Stanford University, 16 pages (Oct. 2000).
Robertson, W., "Run-time Detection of Heap-based Overflows," Proceedings of the $17^{th}$ Large Installation Systems Administrators Conference, San Diego, CA, 15 pages (Oct. 2003).
Rugina, R. and Rinard, M., "Symbolic Bounds Analysis of Pointers, Array Indices, and Accessed Memory Regions," Proceedings of the ACM SIGPLAN Conference on Programming Language Design and Implementation, Vancouver, BC, Canada, 14 pages (Jun. 2000).
Ruwase, O. and Lam, M.S., "A Practical Dynamic Buffer Overflow Detector," Proceedings of the $11^{th}$ Annual Network and Distributed System Security Symposium, San Diego, CA, 11 pages (Feb. 2004).
Schneider, F. B., "Enforceable Security Policies," ACM Transactions on Information and System Security, 3(1): 30-50 (Feb. 2000).
Sekar, R., et al., "A Fast Automaton-Based Method for Detecting Anomalous Program Behaviors," Proceedings of the IEEE Symposium on Security and Privacy, Oakland, CA, 12 pages (May 2001).
Simon, A. and King, A., "Analyzing String Buffers in C," In Proc. Intl. Conference on Algebraic Methodology and Software Technology, LNCS 2422: 365-380 (Sep. 2002).
Simon, I., "A Comparative Analysis of Methods of Defense against Buffer Overflow Attacks," Technical report, California State Univ, 2001. [http://www.mcs.csuhayward.edu/~simon/security/boflo.html], 11 pages (Jan. 2001).
Small, C., "A Tool for Constructing Safe Extensible C++ Systems," $3^{rd}$ USENIX Conference-Object-Oriented Technologies, Portland, OR, pp. 175-184 (Jun. 1997).
Snarskii, Alexander, Freebsd libc stack integrity patch, ftp://ftp.lucky.net/pub/unix/local/libc-letter, 5 pages (Feb. 1997).
Wojtczuk, R., "Defeating Solar Designer's Non-executable Stack Patch," http://www.openwall.com, 11 pages (Jan. 1998).
Vendicator, Stack Shield, "A 'stack smashing' technique protection tool for Linux," http://www.angelfire.com/sk/stackshield, 1 page, (Jan. 2000) (retrieved from Internet Feb. 2010).
Steffen, J. L., "Adding Run-Time Checking to the Portable C Compiler," Software: Practice and Experience, 22(4): 305-316 (Apr. 1992).
Suffield, A., "Bounds Checking for C and C++," Technical Report, Imperial College, 55 pages (2003).
Tanenbaum, A S., "Distributed Operating Systems," Prentice Hall, (1995), Table of Contents included only, 4 pages, Published Date: Aug. 25, 1994.
Viega, J., et al., "ITS4: A Static Vulnerability Scanner for C and C++ Code," Proceedings of the $16^{th}$ Annual Computer Security Applications Conference, New Orleans, LA, 11 pages (Dec. 2000).
VMware Server 2, Product DataSheet; VMWare Virtual Server, http://www.vmware.com.; retrieved from Internet, 2 pages, Feb. 3, 2010.

(56) References Cited

OTHER PUBLICATIONS

Wagner, D. and Dean, D., "Intrusion Detection via Static Analysis," IEEE Symposium on Security and Privacy, Oakland, CA, pp. 156-168 (May 2001).

Wagner, D., et al., "A First Step Towards Automated Detection of Buffer Overrun Vulnerabilities," Proceedings of the Networking and Distributed System Security Symposium, San Diego, CA, 15 pages (Feb. 2000).

Wahbe, R., "Efficient Software-Based Fault Isolation," Proceedings of the 14$^{th}$ ACM Symposium on Operating System Principles, Asheville, NC, 14 pages (Dec. 1993).

Wheeler, David, Flawfinderwebsite, retrieved from Internet: http://www.dwheeler.com/flawfinder/, 11 pages, (Jun. 2001).

Xie, Y., et al., "ARCHER: Using Symbolic, Path-sensitive Analysis to Detect Memory Access Errors," Proceedings of the 9$^{th}$ European Software Engineering Conference, Helsinki, Finland, 14 pages (Sep. 2003).

Xu, J., et al., "Transparent Runtime Randomization for Security," Proceedings of the 22$^{nd}$ International Symposium on Reliable Distributed Systems (SRDS' 03), Florence, Italy, 10 pages (Oct. 2003).

Xu, J., et al., "Architecture Support for Defending Against Buffer Overflow Attacks," Proceedings of the Second Workshop on Evaluating and Architecting System dependability, San Jose, CA, 8 pages (Oct. 2002).

Yong, Suan Hsi and Horwitz, Susan, "Protecting C Programs from Attacks via Invalid Pointer Dereferences," Proceedings of the 9th European Software Engineering Conference, 10 pages (Sep. 2003).

Zhu, G. and Tyagi, Z., "Protection Against Indirect Overflow Attacks on Pointers," Second Intl. Workshop on Information Assurance Workshop, pp. 97-106 (Apr. 2004).

Robbins, Tim, "How to Stop a Hacker . . . ", Feb. 2001, 2 pages, Retrieved from Internet: http://box3n.gumbynet.org.

Howard, M., "Protecting against Pointer Subterfuge (Kinda!)," Jan. 2006, 4 pages, [retrieved from Internet Feb. 26, 2016] http://blogs.msdn.com/b/michael_howard/archive/2006/01/30/520200.aspx.

Lyashko, A., "Hijack Linux System Calls: Part II. Miscellaneous Character Drivers," Oct. 2011, 6 pages [retrieved from Internet Feb. 26, 2016] http://syprog.blogspot.com/2011/10/hijack-linux-system-calls-part-ii.html.

x86 Assembly Guide, University of Virginia Computer Science CS216: Program and Data Representation, 17 pages, Spring 2006 [retrieved from Internet Feb. 26, 2016] http://www.cs.virginia.edu/~evans/cs216/guides/x86.html.

Hunt, G. and Brubacher, D., "Detours: Binary Interception of Win32 Functions," Jul. 1999, 9 pages, Retrieved from the Internet: https://www.microsoft.com/en-us/research/publication/detours-binary-interception-of-win32-functions/.

International Preliminary Report on Patentability for PCT/US2015/037468 dated Dec. 27, 2016 entitled "Automated Root Cause Analysis of Single or N-tiered Applications."

International Search Report and Written Opinion for PCT/US2015/037468 dated Sep. 14, 2015 entitled " Automated Root Cause Analysis of Single or N-tiered Applications".

* cited by examiner

AUTOMATED ROOT CAUSE ANALYSIS OF SINGLE OR N-TIERED APPLICATION

RELATED APPLICATION

This application is the U.S. National Stage of International Application No. PCT/US2015/037468, filed Jun. 24, 2015, which designates the U.S., published in English, and claims the benefit of U.S. Provisional Application No. 61/998,321, filed on Jun. 24, 2014. The entire teachings of the above applications are incorporated herein by reference.

BACKGROUND

Many studies performed by institutions like Carnegie Mellon and vendors of static analysis tools have shown that software developers spend 20% to 25% of their time writing new code and the remaining 75% to 80% of their time either integrating their code with other developer's code or fixing errors in their own code. In either case, fixing all but the most trivial errors can take a long time, especially if the transaction spans multiple threads, processes or tiers. The problem gets even more complicated when these participating processes are running on multiple physical machines.

SUMMARY

Some embodiments may solve the above-mentioned deficiencies of existing approaches. Some embodiments include an automated NTIER (also known as "N-TIER" or multi-tier) debugging tool that provides advantages at least in that it may substantially reduce the number of person-hours spent in solving complex errors. An advantage of some embodiments is that they empower developers to chase down complex problems quickly, thereby saving their employers substantial time and resources. Some embodiments do not require source code to be available for their operation. As a result, in some embodiments, code analysis may be performed at customer a location and also may be extended into third party executables. In addition, some embodiments may correlate time across tiers, which may be advantageous because it may help isolate complex issues that span multiple tiers and require a large amount of state to be kept.

The present disclosure is directed to systems and methods that facilitate a root cause analysis associated with one or more computer applications (also known as "applications"). In some embodiments, the systems and methods may receive a global time reference at the one or more computer applications. Each computer application of the one or more computer applications may have a corresponding local time reference. In some embodiments, the systems and methods may synchronize each local time reference with the global time reference. In some embodiments, the systems and methods may monitor at least one computer instruction of the one or more computer applications with respect to the corresponding local time reference. In some embodiments, the systems and methods may monitor execution, loading, implementation, and/or memory allocation of the at least one computer instruction. In some embodiments, the systems and methods may retrieve information associated with the at least one computer instruction. In some embodiments, the systems and methods may forward at least a portion of the retrieved computer instruction information to a validation engine, wherein the at least a portion facilitates the root cause analysis at the validation engine.

In some embodiments, the systems and methods may adjust the global time reference for network jitter. In some example embodiments, the local time reference may be "adjusted" to the global time reference by way of an adjustment for network traversal time by way of a synchronization packet. In some embodiments, the systems and methods may receive a synchronization message (or packet) in order to synchronize the local time references with the global time references. In some embodiments, the synchronization message may be sent periodically (at an optionally programmable interval) and/or on user command.

In some embodiments, the systems and methods may monitor at least one sequence of the one or more computer instructions and corresponding computer instruction information of the at least one sequence. In some embodiments, the one or more computer applications may include at least two computer applications. In some embodiments, each of the at least two computer applications may have a different tier of a single computer application of the at least two computer applications.

In some embodiments, the systems and methods may, at a validation engine, compare the retrieved computer instruction information with stored computer instruction information to determine unexpected behavior associated with the at least one computer instruction.

In some embodiments of the systems and methods, the monitoring may further comprise: intercepting one or more of the at least one computer instruction in a pipeline of the physical computer; performing dynamic binary instrumentation associated with the one or more of the at least one computer instruction to generate at least one binary-instrumented instruction, and exchanging, in a cache memory of the physical computer, the one or more of the at least one computer instruction with the at least one binary-instrumented instruction.

In some embodiments of the systems and methods, the retrieved computer instruction information may include at least one of: a name of the at least one computer instruction, an address of the at least one computer instruction, an entry state of the at least one computer instruction, an input argument of the at least one computer instruction, an exit state of the at least one computer instruction, a time of the at least one computer instruction, and a return value of the at least one computer instruction. In some embodiments of the systems and methods, the retrieved computer instruction information may include at least one binary computer instruction and the at least one binary computer instruction may include at least one of a function, a system call, an inter-thread communications call, and an inter-process communications call.

Some embodiments of the systems and methods may receive the global time reference at a plurality of computer applications. Each computer application instance of the plurality of computer applications may have a corresponding local time reference. Some embodiments of the systems and methods may monitor at least one computer instruction of the plurality of computer applications with respect to the corresponding local time reference. Some embodiments of the systems and methods may retrieve information associated with the at least one computer instruction of the plurality of computer applications. Some embodiments of the systems and methods may monitor at least one communication between at least two computer applications of the plurality of computer applications. Some embodiments of the systems and methods may retrieve information associated with the at least one communication. Some embodiments of the systems and methods may forward at least a portion of the retrieved computer instruction information and the retrieved communication information to the validation engine. In some embodiments, the at least a portion may facilitate the root cause analysis at the validation engine.

In some embodiments of the systems and methods, two or more of the plurality of computer applications may be located on separate physical machines connected across a network.

In some embodiments, the systems may include an analysis engine. The systems may also include an instrumentation engine that may be communicatively coupled to the analysis engine. The systems may also include a validation engine that may be communicatively coupled to the analysis engine and/or the instrumentation engine.

In some embodiments, the analysis engine and the instrumentation engine may comprise a processor fabric including one or more processors. In some embodiments, the analysis engine, the instrumentation engine, and the validation engine may comprise a processor fabric including one or more processors.

Some embodiments are advantageous for multiple reasons. One advantage of some embodiments is that developers no longer have to use debuggers and place breakpoints or add logging statements to capture runtime state in order to chase these problems down. Another advantage of some embodiments is that source code does not have to be instrumented within a body of code. Yet another advantage of some embodiments is that they do not require source code instrumentation, but rather, may utilize binary instrumentation. Another advantage of some embodiments is that a developer does not have to rebuild code and then observe the results manually before a decision is made. Yet another advantage of some embodiments is that they enable an enhanced debug framework because they do not mask out failures that arise due to race conditions or timing. In some embodiments, failures are not masked at least because the instrumentation applied is not intrusive to the source code, but rather, is binary instrumentation (as opposed to source instrumentation) performed in the instruction cache, thereby avoiding changes to timing or delays of source code instrumentation approaches.

Yet another advantage of some embodiments is that when one or more transactions, processes, or threads run on different machines, a user may keep context and correlate events across each thread, process or tier easily. Another advantage of some embodiments is that they may provide an ability to compare runtime traces from customer setup and developer setup to see where a problem arises. Some embodiments may make it easy to find the source of a problem, providing advantages of reduced time to market and reduced cost for software products.

Some embodiments may provide advantages including trace reports including per thread and per process runtime data from user code, system code, and network activity, which may be synchronized easily through the use of a common high resolution time server. Some embodiments may provide an advantage in that by overlaying tiers in time, complex transactions that spawn multiple tiers may be easily spotted and examined and debugged. An advantage of some embodiments is that user runtime data may be available long after a test is completed. Another advantage of some embodiments is that a user does not need to place instrumentation by a manual or tedious process.

Some embodiments provide advantages with regard to code compatibility. Some embodiments provide an advantage in that they work with compiled code written in languages (also known as "software languages"), including but not limited to C, C++, and other languages, and interpreted code written in languages including but not limited to JAVA, Ruby, PHP, Perl, Python, and other languages. Yet another advantage of some embodiments is that they work with third party applications written using a combination of compiled code written in languages including but not limited to C, C++, and other languages, and interpreted code written in languages including but not limited to JAVA, Ruby, PHP, Perl, Python, and other languages.

Some embodiments may provide advantages with regard to a root cause analysis. In some embodiments, root cause analysis may be performed by comparing traces obtained under "good" conditions where a failure did not occur and where a failure did occur. In some embodiments, root cause analysis may also be performed by comparing known input or output parameters of each function and examining their runtime states. In some embodiments, root cause analysis may be used to pinpoint points of divergence between a known good state versus a known bad state of the computer application.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the disclosure follows.

The teachings of all patents, published applications and references cited herein are incorporated by reference in their entirety.

Modern computer applications, as in some embodiments, may include many tiers (e.g., a multi-tier architecture which is a client-server architecture in which presentation, computer application processing, and data management may be separated). Some embodiments may include but are not limited to a browser tier, a framework tier, a business or application logic tier, and the database tier. When a transaction is initiated as a consequence of some user action in a tier, a cascade of events may be triggered in related computer applications in the n-tiers that together provide the application's functionality. In some embodiments as described herein, it is easy to record and determine where in the multi-tiered computer application's code such failures occurred. Some embodiments overcome the challenges that a user faces when attempting to set breakpoints or some form of logging in the operating code in all tiers because some embodiments do not require such breakpoints or logging.

Some embodiments include debugging of computer applications (e.g., software applications or software) in which functionality of the computer application is distributed in one or more threads, processes and/or tiers. Such software may include combinations of embedded software, including but not limited to embedded software in mobile devices and/or desktop software running on personal computing devices including but not limited to laptops, desktops, and/or web based computer application software running on servers or in data centers. Software applications may further include interpreted code, including but not limited to JAVA or scripts, Ruby, PHP, or compiled code including but not limited to code written in C or C++. Application tiers or processes may run on one or more computing platforms including but not limited to mobile, desktop, laptop, and/or server platforms. In some embodiments, software developer users may troubleshoot errors, whether erratic or consistent, that manifest anywhere in their own or third party applications, including but not limited to frameworks, stacks, and/or libraries. Some embodiments may isolate one or more software errors down to a section of code or to a line of code, even if the one or more software errors arise from third party code.

Overview of Debugging Techniques

Figure 1:
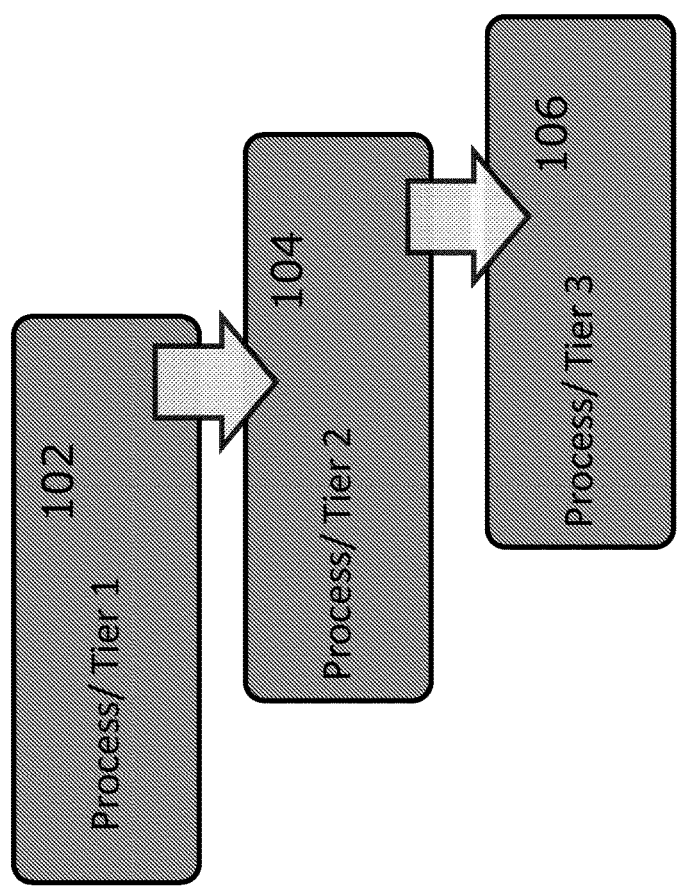
FIG. 1 illustrates breakpoints in multi-tiered processes.

Debugging techniques may be used for debugging a single or multi-tiered computer application, or a single or multi-process computer application. One debugging technique is debugger-based code debugging as illustrated in FIG. 1. Using such a technique, most integrated development environments offer debugging and tracing capabilities. In debugger-based code debugging, the computer application developer (e.g. user, developer, or application developer) runs a debug version of an image and creates breakpoints and/or tracepoints. As the computer application runs and encounters breakpoints, the computer application developer may inspect different variables and record the selected state of predefined variables either by hand or automatically through tracepoints. As illustrated in FIG. 1, if the computer application 100 includes many processes (collectively, 102, 104, 106), individual breakpoints may be placed in each process (each of 102, 104, and 106). When a breakpoint is triggered in Process 1 (element 102), the other processes (104, 106) may be halted as well, so that the state of the computer application may be captured. Handling breakpoints in this manner may be difficult, complex, tedious, cumbersome or impractical.

Some embodiments overcome the above-mentioned deficiencies of debugger-based code debugging. Given that some embodiments do not require source code for debugging, some embodiments do not suffer from the deficiencies of debugger-based code debugging at least in situations where no source code is available for applying breakpoints, including but not limited to situations where constituent threads and processes are third party binaries for which no source code is available for applying breakpoints. Unlike in debugger-based code debugging, some embodiments may successfully debug complex transient problems that occur intermittently (e.g., at some times but not at other times). Since some embodiments do not require placing breakpoints, some embodiments do not suffer from the deficiency of debugger-based code debugging in which the act of placing breakpoints may change the product sufficiently that now transient behavior may not manifest itself. Unlike debugger-based code debugging, in some embodiments the computer application may run with different timing constraints since user threads may run additional code. Given that some embodiments are not dependent on source code, unlike debugger-based debugging, some embodiments may be used at a customer location even when there is no source code available at that location.

Another debugging technique is logging-based code debugging. A developer may resort place logging statements in the source code. Such an approach has a benefit over breakpoint-based debugging, in that application state does not have to be captured manually. Neither does the developer have to capture state manually, nor required to halt downstream threads and processes. Unfortunately, the developer may not always know ahead of time which code the developer should instrument to isolate the problem being debugged. This is an even more complex problem when the developer is dealing with code written by co-developers. Typically, such a process of adding logging messages is an incremental process. Discovering where to place instrumentation may be an iterative process with trial and error attempts. As a result, logging-based code debugging may be useful to debug simple issues. However, as the complexity of issues increases, determining the correct set of instrumentation can become very tedious and frustrating for most developers. Furthermore, the process of adding source code instrumentation may change the behavior of the code and, as such, the original problem may no longer manifest itself (e.g., the problem may be masked or undetectable). Also, this process may not be used at a customer location since there is no source code available at that location. Some embodiments may remedy the above-mentioned deficiencies with respect to logging-based code debugging.

Figure 2:
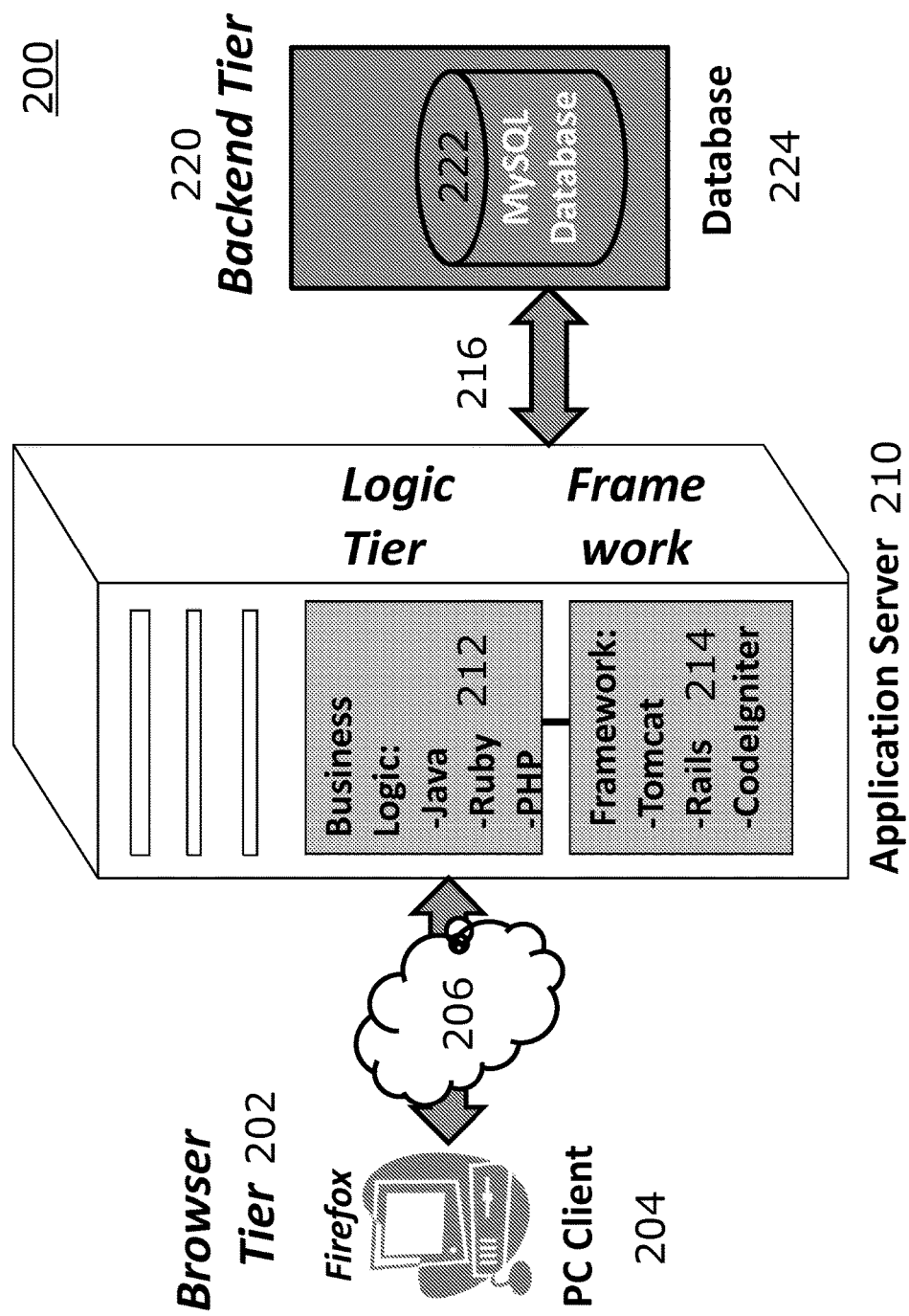
FIG. 2 illustrates an example of a multi-tiered or multi-process application.

Yet another debugging technique is dynamic code debugging 200, as illustrated in FIG. 2. Some commercial tools like DynaTrace inject binary code into the existing user JAVA code automatically. Other tools like New Relic may capture enough state from scripts like Ruby and PHP. As a result, when the AID (or AIDE) JAVA code runs or the PHP/Ruby scripts run, the newly instrumented code may generate a runtime call stack trace with parametric information for that tier or thread (or process). Such information may enable users to determine how the JAVA, PHP, Ruby, or other scripting language code interacts with the rest of the computing environment around it. As illustrated in FIG. 2, commercial tools (including but not limited to DynaTrace or NewRelic) may capture enough run time state for the logic tier 212, but not for the browser tier 202 (which enables a user to communicate through a personal computer or PC client 204 to an application server 210 over a network 206), framework tier 214, or backend tier 220. If the framework tier 214 is not configured properly, the logic tier 212 code may behave incorrectly even though the logic tier 212 is correctly coded. For example, if the hibernate layer in the framework tier 214 is not set up correctly, a simple query to retrieve a field in a record of a database 224 (of the backend tier 220 communicatively coupled to the framework tier 214 through a network 216) may result in a large number of queries being generated as the entire database contents are delivered to the logic tier 212. Debugging why the memory usage suddenly spiked or why fetching one record inundates a SQL database 222 with SQL queries may take a substantial amount of time and resources. More generally, debugging errors introduced because of poorly configured code (own or third party) may be challenging. Some embodiments remedy the above-mentioned deficiencies with respect to dynamic code debugging.

Advantages of Embodiments

Some embodiments may provide advantages in comparison to debugger based code debugging, logging based code debugging, and/or dynamic code debugging. Other embodiments may employ one or more of code debugging, logging based code debugging, and/or dynamic code debugging or a modified form of code debugging, logging based code debugging, and/or dynamic code debugging in conjunction with the method and system.

Some example embodiments do not require access to source code. Therefore, some example embodiments overcome the challenges of debugging a co-developer's complex or hard-to-read code or debugging third party complex or hard-to-read code. Given that some embodiments do not require source code instrumentation, some embodiments do not suffer from the deficiency of instrumentation changes causing new code to not exhibit the same timing artifacts as the released code. As such, some embodiments do not suffer from the deficiency that act of placing source instrumentation may mask a real problem in the code.

In some embodiments, users avoid frustration because they are not required to have experience in placing source code instrumentation and are not required to find a mix of instrumentation which is otherwise a slow, manual, or iterative process without some embodiments. As such, some embodiments do not require tedious and manual correlation for data generated by different tiers, threads, or processes in the application if the problem is one of poorly configured code. Some embodiments may provide other advantages as described in this disclosure herein.

Automated Root Cause Analysis Overview

Some embodiments make the debugging process simple and independent of a developer's skill set, by creating a mechanism that does not alter the original native code of the application and yet manages to place instrumentation on the fly just before the code is executed (e.g., binary instrumentation). Further, in some embodiments, tiers of a product may receive a common time base (e.g., global time reference) suitably adjusted for periodic network delays, so that even though each tier may appear to run asynchronously, in aggregate the tiers may refer to the same time base and therefore, runtime data, such as call stacks, may be overlaid in time. As such, in some embodiments, transactions may appear in a time ordered manner in the final log, irrespective of which tier is executing which code.

Further, in some embodiments, for each tier, runtime data from user code (including but not limited to native, JAVA, or scripting code), system code (including but not limited to system calls which may be Operating System or OS dependent), network code (including but not limited to socket exchange between processes) may be overlaid. As such, in some embodiments, users may quickly scan call stacks from multiple tiers as they occur in time.

In some embodiments, by comparing call stacks from a known good instance of one or more test cases (including but not limited to those produced from detailed test or regression tests performed by Quality Assurance prior to shipping a product) and those produced from a customer deployment, it is easy to spot where the traces start diverging. As a result, in some embodiments, identifying the root cause of problems is easy even for inexperienced developers.

Automated Root Cause Analysis Process

Figure 3:
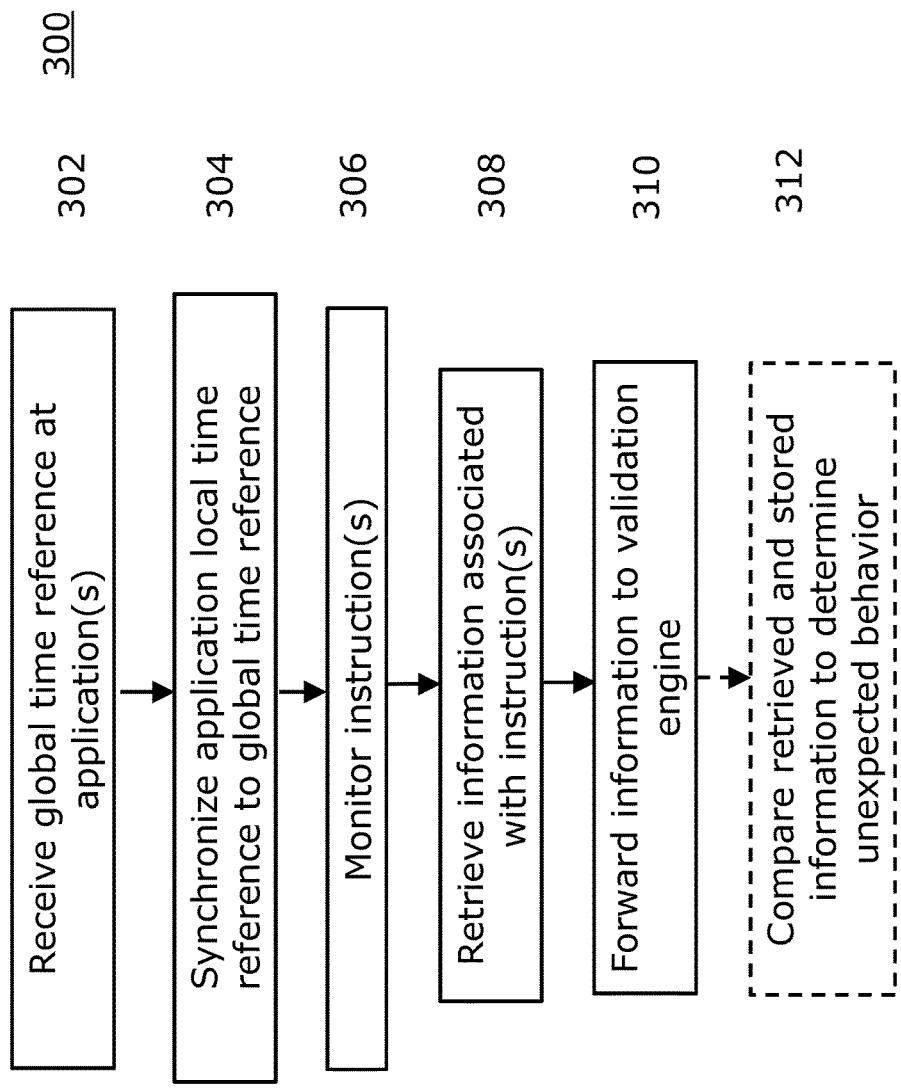
FIG. 3 illustrates a flowchart of an example method for facilitating a root cause analysis associated with one or more computer applications, in embodiments of the present disclosure.

FIG. 3 illustrates a flowchart of an example method (and system) 300 for facilitating a root cause analysis associated with one or more computer applications (and/or tiers of a computer application). The method (and system) 300 may facilitate a root cause analysis associated with one or more computer applications (e.g., computer application tiers). In some embodiments, the method (and system) 300 may receive a global time reference 302 at the one or more computer applications. Each computer application of the one or more computer applications may have a corresponding local time reference. In some embodiments, the system and method 300 may synchronize 304 each local time reference with the global time reference.

Some embodiments may correlate local time references with global time references periodically in order to address network jitter. In some embodiments, each computer application (or tier) may include one or more sets of records that include an ordered pair of timer data in the format {local high resolution timer, common or global network high resolution timer}. Some embodiments may include periodic synchronization between the local and global timers, which may thereby overcome the deficiencies of timing drifts and/or round trip delays. In some embodiments, the systems and methods may adjust the global time reference for network jitter.

In some example embodiments, the local time reference may be "adjusted" to the global time reference by way of an adjustment for network traversal time by way of a synchronization packet (or synchronization pulse or signal). In some embodiments, the systems and methods may receive a synchronization message (or packet or pulse or signal) in order to synchronize the local time references with the global time references. In some embodiments, the synchronization message may be sent periodically (at an optionally programmable interval) and/or on user command.

In some embodiments, the method and system 300 may receive a common (global) time reference at each computer application (or each tier of a computer application). In some embodiments, the method and system 300 may receive the common (global) time reference at each computer application (and/or each application tier). In some embodiments, the method and system 300 may receive the common (global) time reference by using a shared library that periodically contacts a server which sends out high resolution (in some embodiments, 64-bit resolution or higher, but not so limited) time to each computer application (and/or each application tier).

According to some embodiments, each tier (and/or each computer application) may correlate its local high-resolution timers (in some embodiments, 64-bit resolution or higher, but not so limited) with the common time reference high resolution timer adjusted for network jitter. In some embodiments, the common time reference high resolution timer may be adjusted periodically (at regular intervals, irregular intervals, or at times based upon user command). In some embodiments, care may be taken to shut down code that may causes the local machine associated with the local high-resolution timer to change its frequency based on its load.

In some embodiments, the system and method 300 may monitor 306 at least one computer instruction of the one or more computer applications with respect to the corresponding local time reference. In some embodiments, the system and method 300 may retrieve information 308 associated with the at least one computer instruction. In some embodiments, the system and method 300 may forward 310 at least a portion of the retrieved computer instruction information to a validation engine, wherein the at least a portion facilitates the root cause analysis at the validation engine.

In some embodiments, the system and method 300 may monitor 306 at least one sequence of the one or more computer instructions and corresponding computer instruction information of the at least one sequence. In some embodiments, the one or more computer applications may include at least two computer applications. In some embodiments, each of the at least two computer applications may have a different tier of a single computer application of the at least two computer applications. In some embodiments, each of the one or more computer applications may include one or more threads and/or processes.

In some embodiments, the system and method 300 may, at a validation engine, compare 312 the retrieved computer instruction information with stored computer instruction information to determine unexpected behavior associated with the at least one computer instruction.

In some embodiments of the system and method 300, the monitoring 306 may further comprise: intercepting one or more of the at least one computer instruction in a pipeline of the physical computer; performing dynamic binary instrumentation associated with the one or more of the at least one computer instruction to generate at least one binary-instrumented instruction, and exchanging, in a cache memory of the physical computer, the one or more of the at least one computer instruction with the at least one binary-instrumented instruction.

Some embodiments may receive user code runtime data. Some embodiments may receive user runtime code data generated by another thread or process. Other embodiments may generate user code runtime data. Other embodiments may generate user code runtime data used by another thread or process. In some embodiments, an instrumentation engine may intercept binary instructions from the computer application (or tier) at runtime. In other embodiments, the application layer virtual machine may intercept binary instructions from the computer application (or tier) at runtime. In some embodiments, such binary instructions may be intercepted in the pipeline of the central processor unit (CPU) and exchanged with instrumented versions of the binary instructions, such that the instrumentation captures the name of a computer instruction (e.g., function and/or system call), its state (Enter) and/or its input arguments. As the computer instruction returns, the name and/or address of the computer instruction may be captured, along with the computer instruction's state (e.g., receive, transmit, entry, or exit state) and its return values, and reported into a log (e.g., a local log). In some embodiments, at the end of the test case, these reports (e.g., local logs) may be forwarded to a validation engine (e.g., to an analytics server, or locally on the same machine as one or more of the computer applications) for further processing. In some embodiments, one or more of the reports forwarded to the validation engine may include periodic time synchronization messages between the local and remote timers (e.g., local and remote time references). In some embodiments, the analytics server may update the local time to a "network" time for each tier.

In some embodiments, an instrumentation engine located at each tier (or computer application) may intercept user function calls, system calls, socket calls, inter-process calls, and inter-thread calls including but not limited to shared memory or pipes. In other embodiments, a virtual machine located at each tier (or computer application) may intercept user function calls, system calls, socket calls, inter-process calls, and inter-thread calls. In some embodiments, each type of runtime "trace" may be time stamped and reported (e.g., written) into the local logs. Some embodiments may time stamp and report runtime "traces" based upon both compiled code and interpreted code. In some embodiments, these logs may be forwarded (e.g., exported) to the aforementioned validation engine.

In some embodiments, the tiers (or computer applications) may be located on the same physical machine. In some embodiments, the tiers (or computer applications) may be located on the same physical machine as the validation engine. In some embodiments, the validation engine may be located at the same physical machine as the instrumentation engine and analysis engine described earlier in this disclosure. In some embodiments, the tiers (or computer applications) may be located on one or more different physical machines. In some embodiments, the tiers (or computer applications) may be located on the same physical machine as the validation engine. In some embodiments, the validation engine may be located at a different physical machine as the instrumentation engine and analysis engine described earlier in this disclosure.

In some embodiments of the system and method 300, the retrieved computer instruction information (of the retrieving step 308) may include at least one of: a name or address of the at least one computer instruction, an address of the at least one computer instruction, an entry state of the at least one computer instruction, an input argument of the at least one computer instruction, an exit state of the at least one computer instruction, a time of the at least one computer instruction, and a return value of the at least one computer instruction. In some embodiments of the systems and methods, the retrieved computer instruction information may include at least one binary computer instruction and the at least one binary computer instruction includes at least one of a function, a system call, an inter-thread communications call, and an inter-process communications call.

In some embodiments, given that runtime data from each tier, process, and/or thread may be recorded against the same network time, some embodiments may receive data from each tier, and even observe code that results in inter-thread or inter-process communication (e.g., transactions). In some example embodiments, if one tier may communicate with another tier through communication protocols, including but not limited to transmission control protocol (TCP) sockets, shared memory, or pipes.

Some embodiments of the system and method 300 may receive 302 the global time reference which may be periodically adjusted for network jitter at a plurality of computer applications. In some embodiments of the system and method 300, two or more of the plurality of computer applications may be located on separate physical machines connected across a network. Each computer application instance of the plurality of computer applications may have a corresponding local time reference. Some embodiments of the system and method 300 may monitor 306 at least one computer instruction of the plurality of computer applications with respect to the corresponding local time reference. Some embodiments of the system and method 300 may retrieve 308 information associated with the at least one computer instruction of the plurality of computer applications. Some embodiments of the system and method 300 may monitor 306 at least one communication between at least two computer applications of the plurality of computer applications. Some embodiments of the system and method 300 may retrieve 308 information associated with the at least one communication. Some embodiments of the systems and method 300 may forward 310 at least a portion of the retrieved computer instruction information and the retrieved communication information to the validation engine.

In some embodiments, the at least a portion of generated traces may facilitate the root cause analysis at the validation engine. Some embodiments may include multiple methods of determining root cause of errors, warnings, faults, or failures related to the information retrieved using the above-mentioned method and system. Some embodiments may spot faulty input arguments or return values by comparing at least one known computer instruction (such as a function, or application programming interface, or API) with their known ranges and/or return values. In an example embodiment, a computer instruction may accept an integer input parameter that is expected to vary between values of 0 and 10. As such, in an example embodiment, if an instance of that computer instruction having an input value greater than a value of 10 is detected, a trace backwards may be performed from the point of detection, in order to determine what caused that integer input parameter to exceed the bounds.

In some embodiments, the trace reports from each computer application (e.g., tier) may be saved in Comma Separated Value (CSV) format files. These CSV files may be available for each tier. Users (including developers or their designated agents) may run the same test case they ran when shipping the product while the instrumentation engine (or in some embodiments, virtual machine) is running at the customer location where error is observed in order to retrieve information associated with the computer instructions. The CSV files generated may then be compared using standard "diff" techniques. In some embodiments, points of divergence may be easily found and pinpointed.

Automated Root Cause Analysis System

Figure 4:
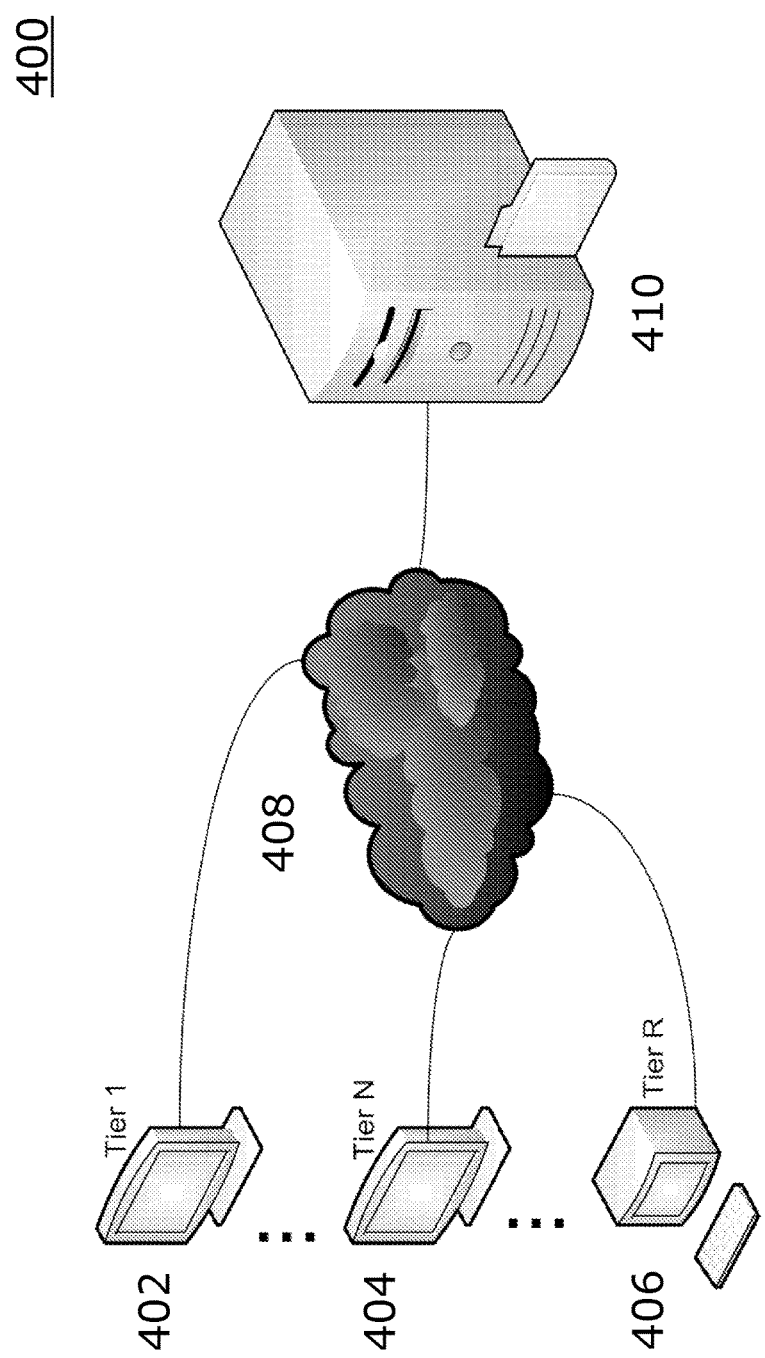
FIG. 4 illustrates an example embodiment system of the flowchart of FIG. 3.

FIG. 4 illustrates an example embodiment system 400 of the flowchart of FIG. 3. FIG. 4 also illustrates serving a common time base, in embodiments of the present disclosure. As illustrated in FIG. 4, each computer application (or tier) of the one or more computer applications (or tiers) 402, 404, 406 may have a corresponding local time reference. In some embodiments, the analysis engine associated with each application (or tier) 402, 404, 406 may synchronize the given local time reference of the application (or tier) 402, 404, 406 with the global time reference generated by a server 410 through a network 408. In some embodiments, the system 400 may adjust the global time reference for network jitter.

In some example embodiments, the local time reference may be "adjusted" to the global time reference by way of an adjustment for network traversal time by way of a synchronization packet, synchronization pulse, or synchronization signal. In some embodiments, the server 410 may generate a synchronization message (or packet or pulse or signal) that is received by each of the applications (or tiers) 402, 404, 406 in order to synchronize the local time reference of each application (or tier) with the global time reference. In some embodiments, the synchronization message may be sent periodically (at an optionally programmable interval) and/or on user command. In some embodiments, the local time references, global time reference, and corresponding synchronization between them may be implemented as physical clock circuitry.

In some embodiments, an instrumentation engine may monitor at least one computer instruction of the one or more computer applications with respect to the corresponding local time reference. In some embodiments, the instrumentation engine may retrieve information associated with the at least one computer instruction. In some embodiments, the instrumentation engine may forward at least a portion of the retrieved computer instruction information to a validation engine, wherein the at least a portion facilitates the root cause analysis at the validation engine. In some embodiments, the validation engine may be located on the server 410. In some embodiments, the validation engine may be located one on or more of the physical machines associated with the computer applications (or tiers) 402, 404, 406.

Instrumentation of Instructions

Figure 5:
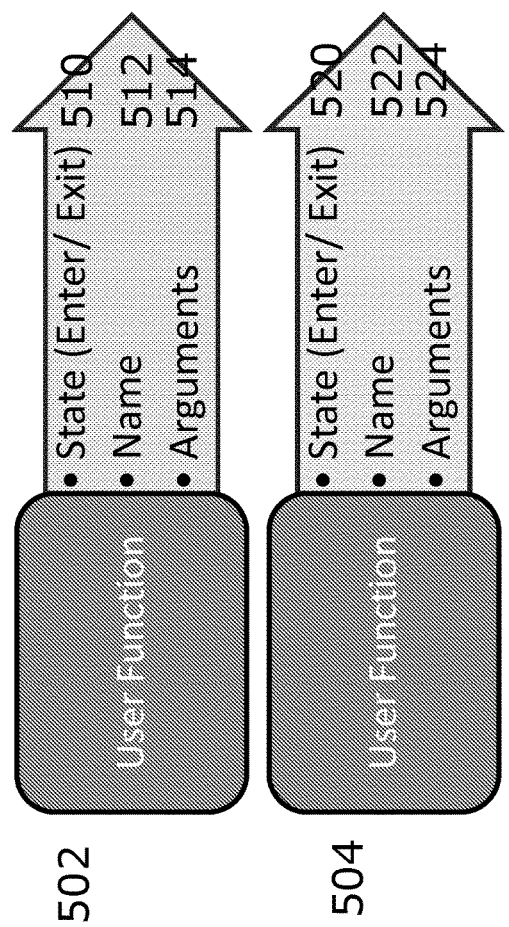
FIG. 5 illustrates instrumenting user code at run time, in embodiments of the present disclosure.

As illustrated in FIG. 5, in some embodiments, an instrumentation engine 500 may intercept binary computer instructions 502, 504 from the computer application (or tier) at runtime. The binary computer instructions 502, 504 may include at least one of a function, a system call, an inter-thread communication, and an inter-process communication. In some embodiments, such binary instructions 502, 504 may be intercepted in the pipeline of the central processor unit (CPU) and exchanged with instrumented versions of the binary instructions, such that the instrumentation captures the name of a computer instruction (e.g., function and/or system call) 512 or 522, its state (e.g, enter state or exit state) 510 or 520, and/or its input arguments 514 or 524. As the computer instruction 502 or 504 returns, the name 512 or 522 of the computer instruction may be captured, along with the computer instruction's state (e.g., exit state) 510 or 520 and its return values, and reported into a log (e.g., a local log) which is forwarded to the validation engine.

Correlating Events Across Tiers

Figure 6:
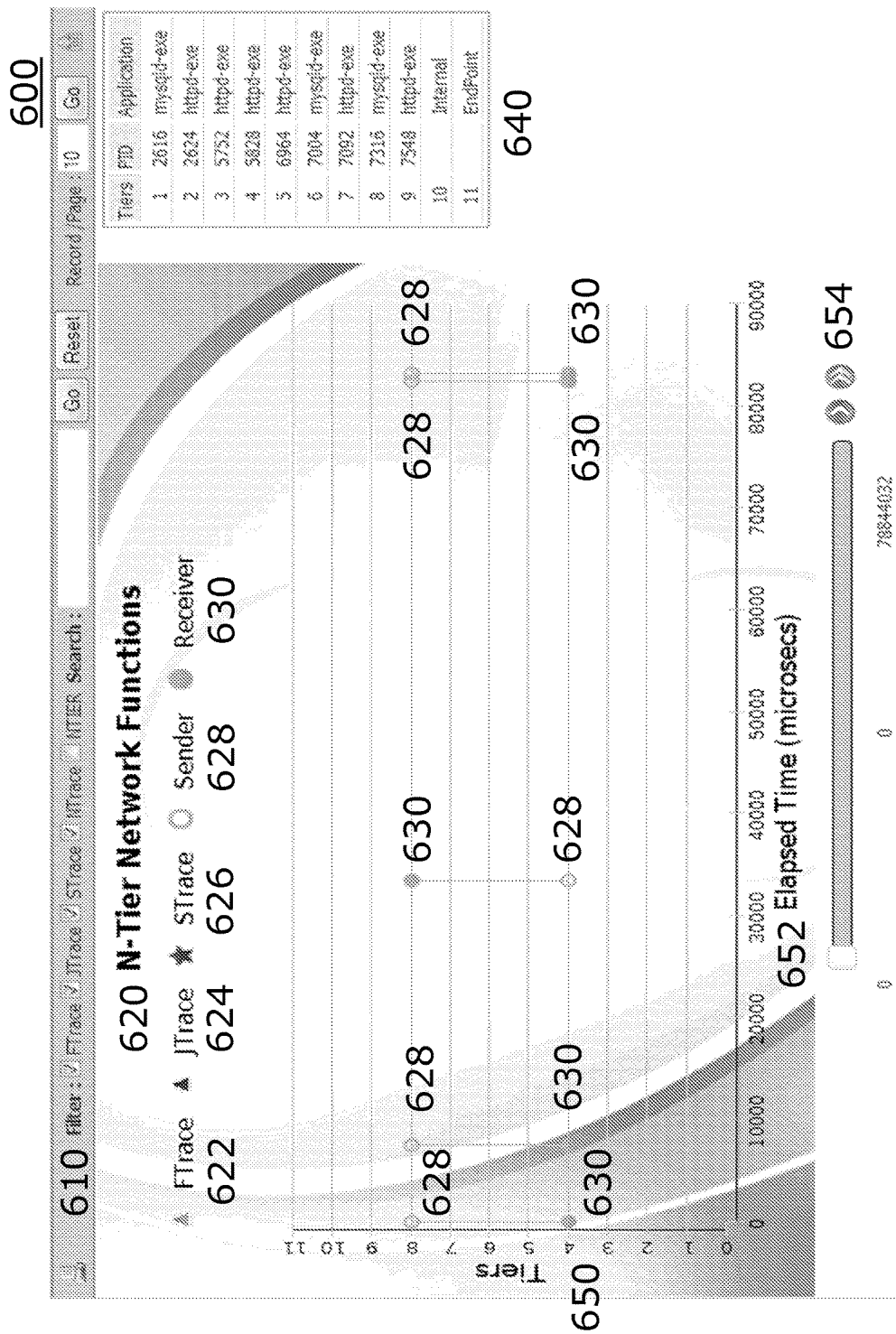
FIG. 6 illustrates a multi-tier event correlation display, in embodiments of the present disclosure.

FIG. 6 illustrates multi-tier event correlation display 600, in embodiments of the present disclosure. In some embodiments, runtime data from each tier, process, and/or thread may be recorded against the same network time. Some embodiments may present data from each tier and observe code that results in inter-thread and/or inter-process communication. In some example embodiments, if one tier communicates with another tier through transmission control protocol (TCP) sockets, such inter-thread and/or inter-process communications may be observed in each participating tier.

As illustrated in FIG. 6, embodiments may include a display 600 in which users may examine the different participating tiers 640 as displayed in the top right corner and in the Y-axis 650. In an example embodiment illustrated in FIG. 6, users may view interaction between tiers 4 and 8 which are the framework tier (tier 4) and database tier (tier 8) respectively. In the example embodiment in FIG. 6, a user may view communication being sent 628 from a tier and communication being received 630 by a tier at a given time 652. By quickly traversing NTIER (n-tier or multi-tier) transactions in time (see elapsed time, reference element 652, and user keys for traversal 654), users may pinpoint complex NTIER activity and correlate runtime data passed between user, system, and network calls between such tiers. Some embodiments of the display 600 also includes a display of network functions 620 (collectively, 622 for function trace or FTrace, 624 for JAVA trace or JTrace, 626 for System trace or STrace, 628 for sender, and 630 for receiver), which are associated with an optional filter 610 which adds or removes the corresponding network function element (622, 624, 626, 628, or 630) from the display 600 based on user command.

Monitoring Agent and Analysis Engine Infrastructure

Figure 7A:
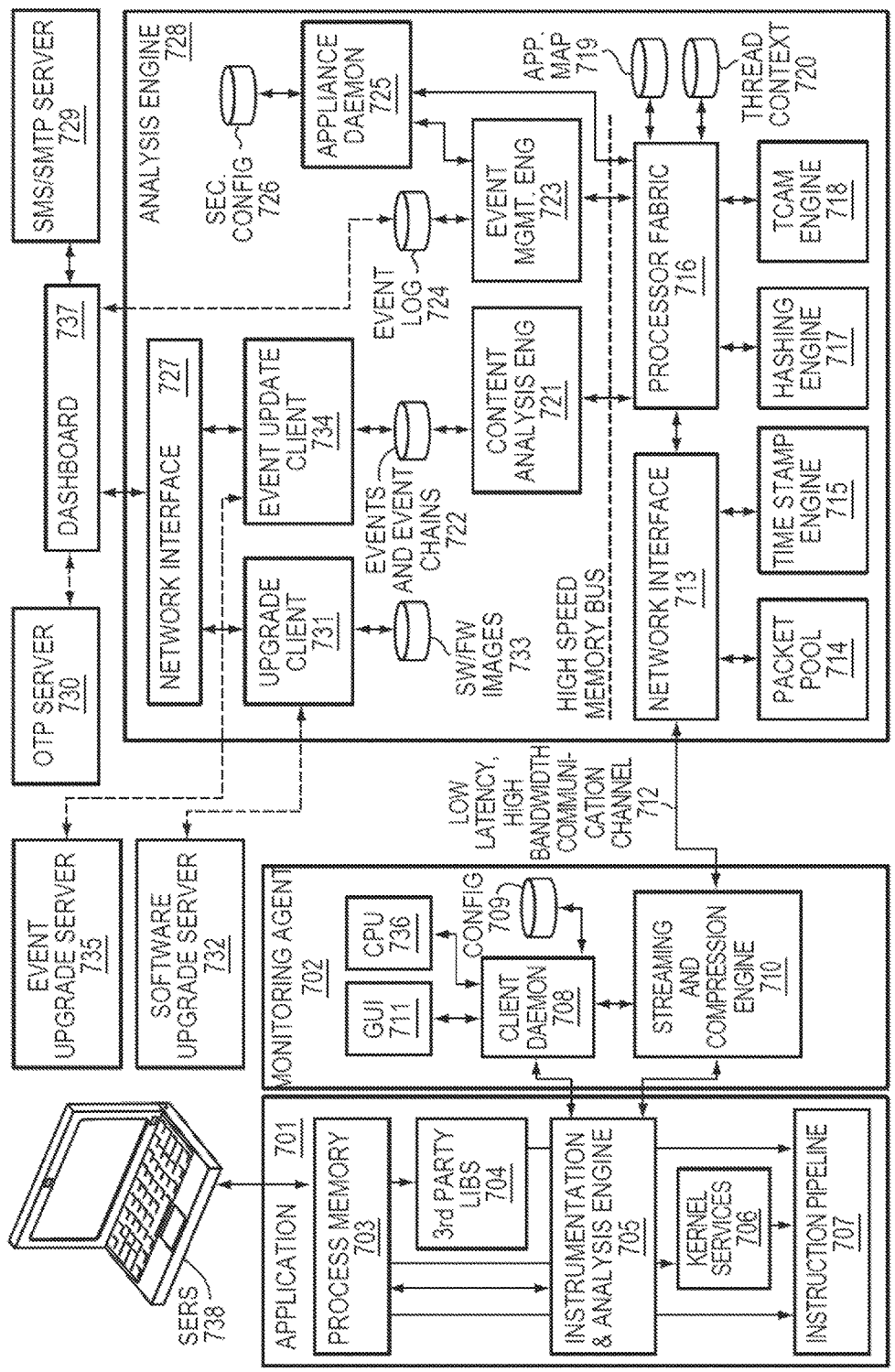
FIG. 7A illustrates an example block diagram of the client and analysis engine in embodiments of the present disclosure.

FIG. 7A depicts a high level block diagram of an example monitoring agent and analysis engine infrastructure. This infrastructure may be configured on a various hardware including computing devices ranging from smartphones, tablets, laptops, desktops to high end servers. As shown in this figure, data collection performed by the Monitoring Agent 702 may be segregated from analysis performed by the analysis Engine to improve application performance. The infrastructure provides high availability to prevent hackers from subverting its protection against malware attacks. The Monitoring Agent 702 interacts with an application to gather load time and runtime data. The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 738 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the Instrumentation and Analysis Engine (i.e., instrumentation engine) 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Instrumentation & Analysis Engine 705 and itself. The Client Daemon also ensures that if any Monitoring Agent process, including itself, becomes unresponsive or dies, it will be regenerated. This ensures that the Monitoring Agent 702 is a high availability enterprise grade product.

The Instrumentation and Analysis Engine 705 pushes load and runtime data collected from the application into the Streaming Engine. The Streaming Engine packages the raw data from the Monitoring Agent 702 into the PDU. Then it pushes the PDU over a high bandwidth, low latency communication channel 712 to the Analysis Engine 728. If the Monitoring Agent 702 and the Analysis Engine 728 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 728 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which may contain a table of the memory addresses used by a class of user executing an application monitored by the system. The infrastructure of the Analysis Engine 728 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 737, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine 728 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 728 performs searches, it may, from time to time find an invalid transition, invalid operation of critical/admin functions or system calls, or find a memory write on undesirable locations. In each of these cases, the Analysis Engine 728 dispatches an event of the programmed severity as described by the policy stored in the Event and Event Chain database 722 to the Event Management Engine 723. The raw event log is stored in the Event Log Database 724. The Dashboard/CMS 737 can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard/CMS 737 accordingly. The Dashboard/CMS 737 provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard/CMS 737 requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 728. For this purpose, it must read configuration information from the Analysis Engine Configuration database 726. The daemon is also responsible for running a heartbeat poll for all processes in the Analysis Engine 728. This ensures that all the devices in the Analysis Engine ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 728 or of the Monitoring Agent 702 for purposes such as fixing errors in the software. For this purpose, the Upgrade Client 731 constantly checks with the Software Upgrade Server 732 where the latest software is available. If the client finds that the entities in the Analysis Engine 728 or the Monitoring Agent 702 are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 728 or the Monitoring Agent 702 does not match the image for the same component in the System image, then all images will be rolled to a previous known good system image.

PDU for Monitoring Agent and Analysis Engine Communication

Figure 7B:
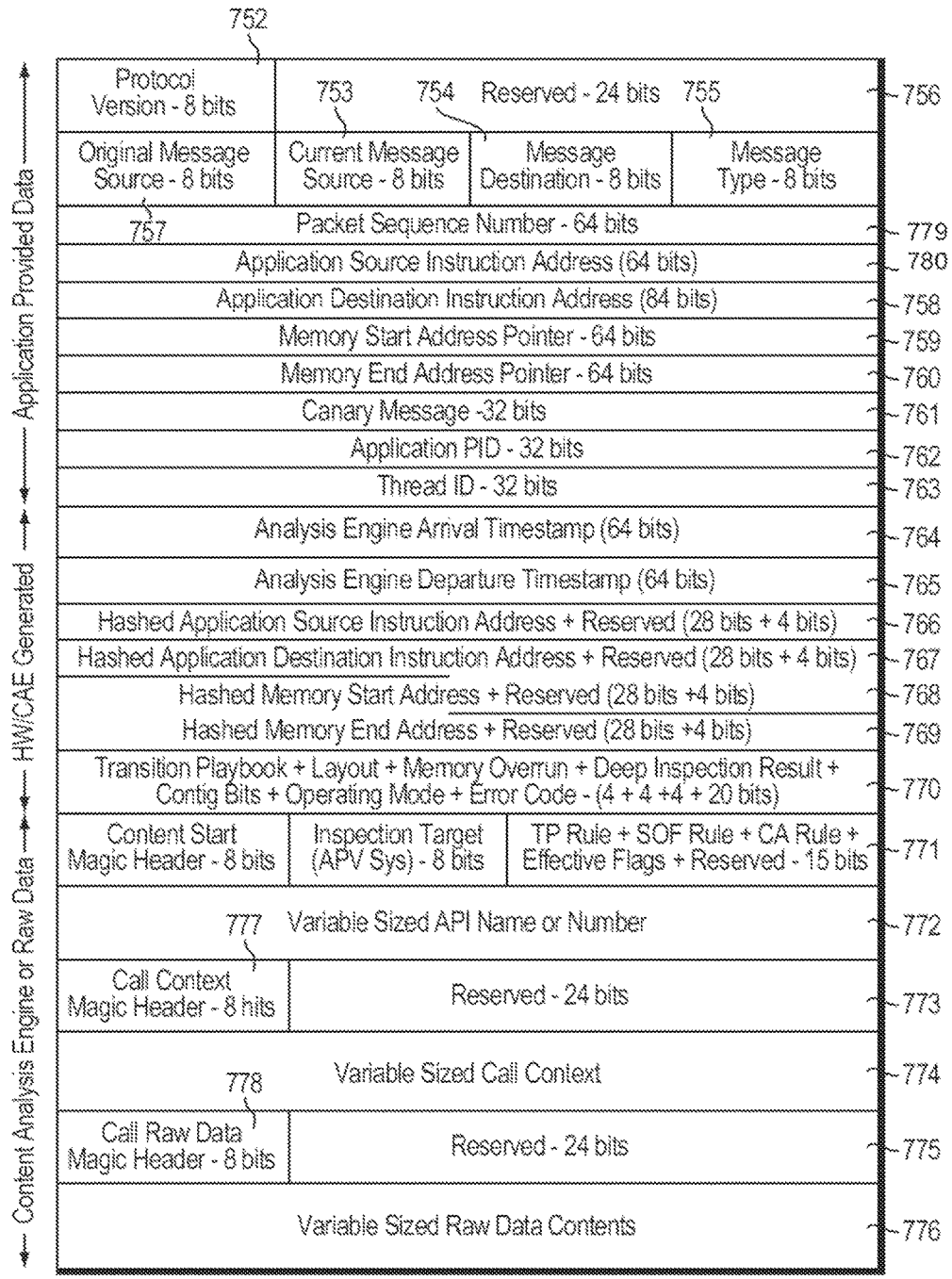
FIG. 7B illustrates an example protocol data unit (PDU) used to transmit data between the client and an analysis engine of FIG. 7A.

FIG. 7B illustrates an example protocol data unit (PDU) used to transmit data between the Monitoring Agent 702 and an Analysis Engine 728 of FIG. 7A. In order for the Monitoring Agent 702 and the Analysis Engine 728 to work effectively with each other, they communicate with each other using the PDU. The PDU can specifically be used by the Monitoring Agent 702 to package the extracted model of the application and/or collected runtime data for transmission to the Analysis Engine 728. The PDU contains fields for each type of information to be transmitted between the Monitoring Agent 702 and the Analysis Engine 728. The PDU is divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block
9. Client iWarp/RDMA/ROCE Ethernet Driver (100 Mb/1 Gb/10 Gb)

Per PCI Card Entities (Starting Address=20+n*20)
20. Analysis Engine TOE block
21. Analysis Engine PCI Bridge
22. Decompression Block
23. Message Verification Block
24. Packet Hashing Block
25. Time-Stamping Block
26. Message Timeout Timer Block
27. Statistics Counter Block
28. Analysis Engine Query Router Engine
29. Analysis Engine Assist Analysis Engine Host Entities
200. Analysis Engine PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database
SIEM Connectors
220. SIEM Connector 1—Dashboard/CMS
221. SIEM Connector 2—HP ArcSight 222. SIEM Connector 3—IBM QRadar
223. SIEM Connector 4—Alien Vault USM
Analysis Engine Infrastructure Entities
230. Dashboard/CMS
231. SMTP Server
232. LDAP Server
233. SMS Server
234. Entitlement Server
235. Database Backup Server
236. OTP Client
237. OTP Server
238. Checksum Server
239. Ticketing Server
240. Event Chain Upgrade Server
241. Software Update Server
All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Monitoring Agent side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 728 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAE Generated section additionally contains other fields related to the Canary 771 including the Hardcoded Content Start Magic header, API Name Magic Header, Call Context Magic Header and Call Raw Data Magic Header are present in all PDU packets.

The HW/CAE Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 728 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 728 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Infrastructure

Figure 8:
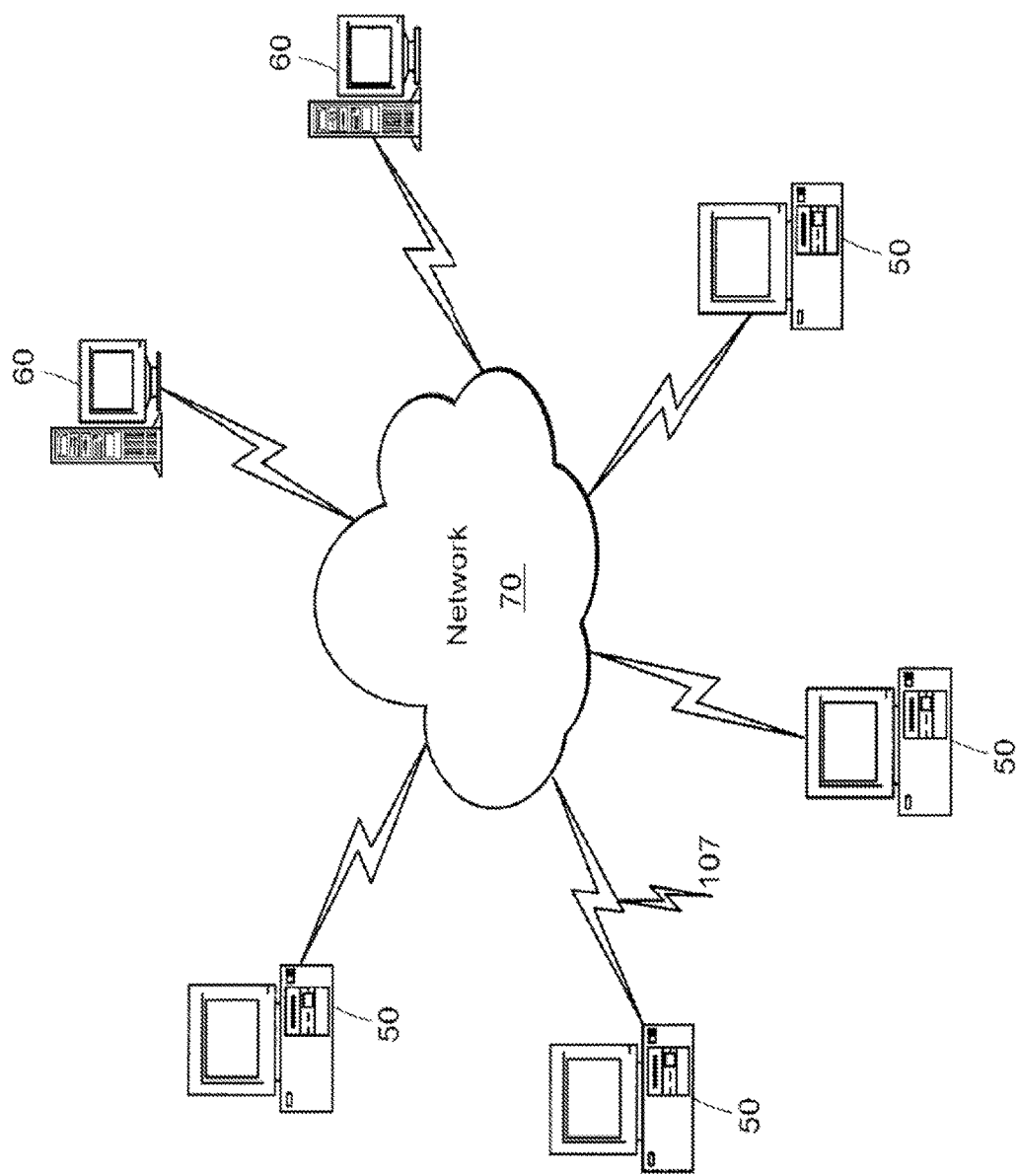
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured with the monitoring agent. Server computers 60 may be configured as the analysis engine which communicates with client devices (i.e., monitoring agent) 50 for accessing the automated root cause analysis debug tool. The server computers 60 may not be separate server computers but part of cloud network 70. In some embodiments, the server computer (e.g., analysis engine) may receive a global time reference at the one or more computer applications. Each computer application of the one or more computer applications may have a corresponding local time reference. Each server computer 60 may synchronize each local time reference with the global time reference. The server computer 60 may include an instrumentation engine that is configured to monitor at least one computer instruction of the one or more computer applications with respect to the corresponding local time reference. The instrumentation engine may retrieve information associated with the at least one computer instruction and forward at least a portion of the retrieved computer instruction information to a validation engine.

The client (monitoring agent, and/or in some embodiments a validation engine) 50 may receive the at least a portion of retrieved computer instruction information from the server (analysis and/or instrumentation engine) 60. In some embodiments, the client 50 may include client applications or components (e.g., instrumentation engine) executing on the client (i.e., monitoring agent, and/or in some embodiments a validation engine) 50 for monitoring computer instructions and retrieving information associated with the computer instructions to facilitate the root cause analysis, and the client 50 may communicate this information to the server (e.g., analysis engine) 60.

Figure 9:
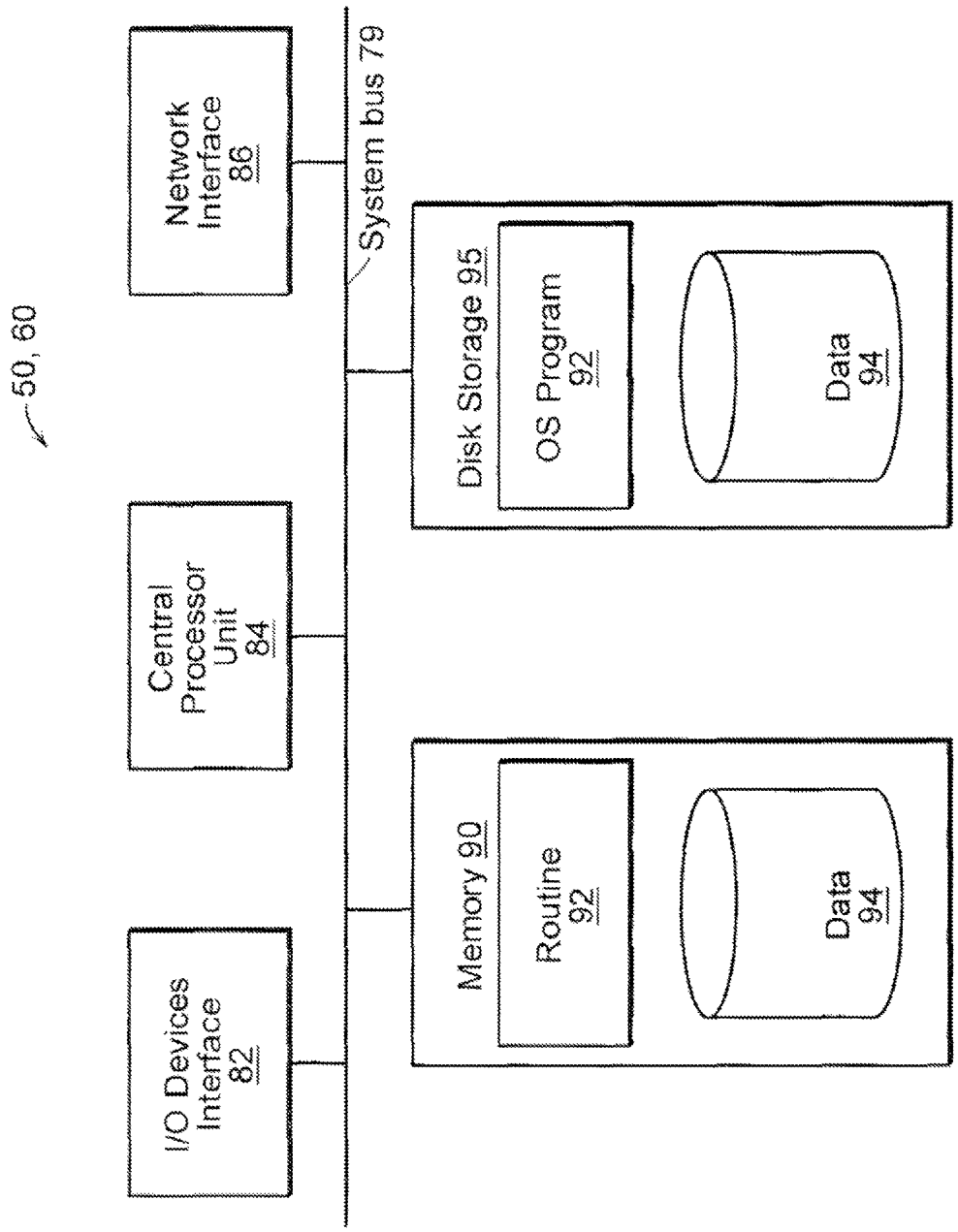
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Some embodiments may transform the behavior and/or data of one or more computer instructions by intercepting the instructions and performing dynamic binary instrumentation on the instructions. Some embodiments may further transform the behavior and/or data of the one or more computer instructions by exchanging the computer instructions with the binary-instrumented instructions, in a cache memory of a physical computer. Some embodiments also transform computer instructions in time by synchronizing the instructions between local and global time references. Some embodiments further transform computer instructions by retrieving information associated with the instructions, and forwarding the retrieved information to a validation engine.

Some embodiments also provide functional improvements to the quality of computer applications, computer program functionality, and/or computer code by automating root cause analysis across one or more tiers of a computer application. Some embodiments also provide functional improvements in that source code (or tracing code) does not have to be instrumented within the body of code. Some embodiments also provide functional improvements in that they do not require source code instrumentation, but rather, may utilize binary instrumentation. Some embodiments also provide functional improvements in that computer instruction failures are not masked at least because the instrumentation applied is not intrusive to the source code, but rather as binary instrumentation, thereby avoiding changes to timing or delays of source code instrumentation approaches. Some embodiments also provide functional improvements by providing trace reports including per thread and per process runtime data from user code, system code, and network activity, which may be synchronized easily through the use of a common high resolution time server. Some embodiments also provide functional improvements in that user runtime data may be available long after a test is completed. Some embodiments also provide functional improvements because by overlaying tiers in time, complex transactions that spawn multiple tiers may be easily spotted and examined and debugged.

Some embodiments solve a technical problem (thereby providing a technical effect) in that developers no longer have to use debuggers and place breakpoints or add logging statements to capture runtime state in order to chase code problems down. Some embodiments solve a technical problem (thereby providing a technical effect) in that a developer does not have to rebuild code and then observe the results manually before a decision is made. Some embodiments solve a technical problem (thereby providing a technical effect) in that they enable an enhanced debug framework because they do not mask out failures that arise due to race conditions or timing between threads. Some embodiments solve a technical problem (thereby providing a technical effect) in that when one or more transactions, processes, or threads run on different machines, a user may keep context and correlate events across each thread, process or tier easily, unlike in existing approaches. Some embodiments solve a technical problem (thereby providing a technical effect) in that they provide an ability to compare runtime traces from customer setup and developer setup to see where a problem arises. As a result of this technical solution (technical effect), some embodiments may make it easy to find the source of a problem, providing advantages of reduced time to market and reduced cost for software products. Some embodiments solve a technical problem (thereby providing a technical effect) in that a user does not need to place instrumentation by a manual or tedious process. Some embodiments solve a technical problem (thereby providing a technical effect) in that they provide code compatibility. For example, some embodiments work with compiled code written in languages including but not limited to C, C++, and other languages, and interpreted code written in languages including but not limited to JAVA, Ruby, PHP, Perl, Python, and other languages. And some embodiments work with third party applications written using a combination of compiled code written in languages including but not limited to C, C++, and other languages, and interpreted code written in languages including but not limited to JAVA, Ruby, PHP, Perl, Python, and other languages. Some embodiments solve a technical problem (thereby providing a technical effect) in that they provide advantages with regard to a root cause analysis. In some embodiments, root cause analysis may be performed by comparing traces obtained under "good" conditions where a failure did not occur and where a failure did occur. In some embodiments, root cause analysis may also be performed by comparing known input or output parameters of each function and examining their runtime states. In some embodiments, root cause analysis may be used to pinpoint points of divergence between a known good state versus a known bad state of the computer application.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method for facilitating a root cause analysis associated with one or more computer applications, the method executed by a physical computer comprising a processor within a system, the method comprising, by the processor:
   receiving a global time reference at the one or more computer applications, each computer application of the one or more computer applications having a corresponding local time reference;
   synchronizing each local time reference with the global time reference;
   monitoring at least one computer instruction of the one or more computer applications with respect to the corresponding local time reference;
   retrieving information associated with the at least one computer instruction; and
   forwarding at least a portion of the retrieved computer instruction information to a validation engine, wherein the at least a portion facilitates the root cause analysis at the validation engine.

2. The method of claim 1, further comprising adjusting the global time reference for network jitter.

3. The method of claim 1, further comprising monitoring at least one sequence of the one or more computer instructions and corresponding computer instruction information of the at least one sequence.

4. The method of claim 1, wherein the one or more computer applications include at least two computer applications, each of the at least two computer applications having a different tier of a single computer application of the at least two computer applications.

5. The method of claim 1, further comprising, at the validation engine, comparing the retrieved computer instruction information with stored computer instruction information to determine unexpected behavior associated with the at least one computer instruction.

6. The method of claim 1, wherein the monitoring further comprises:
   intercepting one or more of the at least one computer instruction in a pipeline of the physical computer;
   performing dynamic binary instrumentation associated with the one or more of the at least one computer instruction to generate at least one binary-instrumented instruction, and
   exchanging, in a cache memory of the physical computer, the one or more of the at least one computer instruction with the at least one binary-instrumented instruction.

7. The method of claim 1, wherein the retrieved computer instruction information includes at least one of: a name of the at least one computer instruction, an address of the at least one computer instruction, an entry state of the at least one computer instruction, an input argument of the at least one computer instruction, an exit state of the at least one computer instruction, a time of the at least one computer instruction, and a return value of the at least one computer instruction.

8. The method of claim 1, wherein the at least one computer instruction includes at least one binary computer instruction and the at least one binary computer instruction includes at least one of a function, a system call, an inter-thread communications call, and an inter-process communications call.

9. The method of claim 1, further comprising;
   receiving the global time reference at a plurality of computer applications, each computer application instance of the plurality of computer applications having a corresponding local time reference;
   monitoring at least one computer instruction of the plurality of computer applications with respect to the corresponding local time reference, and retrieving information associated with the at least one computer instruction of the plurality of computer applications, and monitoring at least one communication between at least two computer applications of the plurality of computer applications, and retrieving information associated with the at least one communication; and
   forwarding at least a portion of the retrieved computer instruction information and the retrieved communication information to the validation engine, wherein the at least a portion facilitates the root cause analysis at the validation engine.

10. The method of claim 8, wherein two or more of the plurality of computer applications are located on separate physical machines connected across a network.

11. A system comprising:
   an analysis engine configured to:
      receive a global time reference at the one or more computer applications, each computer application of the one or more computer applications having a corresponding local time reference; and
      synchronize each local time reference with the global time reference; and an instrumentation engine configured to:
monitor at least one computer instruction of the one or more computer applications with respect to the corresponding local time reference;
retrieve information associated with the at least one computer instruction; and
forward at least a portion of the retrieved computer instruction information to a validation engine, wherein the at least a portion facilitates the root cause analysis at the validation engine.

12. The system of claim 11, wherein the analysis engine is further configured to adjust the global time reference for network jitter.

13. The system of claim 11, wherein the instrumentation engine is further configured to monitor at least one sequence of the one or more computer instructions and corresponding computer instruction information of the at least one sequence.

14. The system of claim 11, wherein the one or more computer applications include at least two computer applications, each of the at least two computer applications having a different tier of a single computer application of the at least two computer applications.

15. The system of claim 11, further comprising, at the validation engine, comparing the retrieved computer instruction information with stored computer instruction information to determine unexpected behavior associated with the at least one computer instruction.

16. The system of claim 11, wherein the instrumentation engine is further configured to monitor, the monitoring including:
intercepting one or more of the at least one computer instruction in a pipeline of the physical computer;
performing dynamic binary instrumentation associated with the one or more of the at least one computer instruction to generate at least one binary-instrumented instruction, and
exchanging, in a cache memory of the physical computer, the one or more of the at least one computer instruction with the at least one binary-instrumented instruction.

17. The system of claim 11, wherein the retrieved computer instruction information includes at least one of: a name of the at least one computer instruction, an address of the at least one computer instruction, an entry state of the at least one computer instruction, an input argument of the at least one computer instruction, an exit state of the at least one computer instruction, a time of the at least one computer instruction, and a return value of the at least one computer instruction.

18. The system of claim 11, wherein the at least one computer instruction includes at least one binary computer instruction and the at least one binary computer instruction includes at least one of a function, a system call, an inter-thread communications call, and an inter-process communications call.

19. The system of claim 11, wherein:
the analysis engine is further configured to:
receive the global time reference at a plurality of computer applications, each computer application instance of the plurality of computer applications having a corresponding local time reference; and
the instrumentation engine is further configured to:
monitor at least one computer instruction of the plurality of computer applications with respect to the corresponding local time reference, and retrieve information associated with the at least one computer instruction of the plurality of computer applications, and monitor at least one communication between at least two computer applications of the plurality of computer applications, and retrieve information associated with the at least one communication; and
forward at least a portion of the retrieved computer instruction information and the retrieved communication information to the validation engine, wherein the at least a portion facilitates the root cause analysis at the validation engine.

20. The system of claim 19, wherein two or more of the plurality of computer applications are located on separate physical machines connected across a network.

21. The system of claim 11, wherein the analysis engine and the instrumentation engine comprise a processor fabric including one or more processors.

22. The system of claim 11, wherein the analysis engine, the instrumentation engine, and the validation engine comprise a processor fabric including one or more processors.

* * * * *

UNITED STATES PATENT AND TRADEMARK OFFICE
CERTIFICATE OF CORRECTION

PATENT NO. : 10,114,726 B2
APPLICATION NO. : 15/318419
DATED : October 30, 2018
INVENTOR(S) : Satya Vrat Gupta It is certified that error appears in the above-identified patent and that said Letters Patent is hereby corrected as shown below:

On the Title Page

Item (54) and in the Specification, Column 1, Line 1, delete "AUTOMATED ROOT CAUSE ANALYSIS OF SINGLE OR N-TIERED APPLICATION" and insert -- AUTOMATED ROOT CAUSE ANALYSIS OF SINGLE OR N-TIERED APPLICATIONS --.

In the Claims

In Claim 10, Column 22, at Line 57, delete "The method of claim 8," and insert -- The method of claim 9, --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*